United States Patent
Sheedy et al.

(10) Patent No.: US 10,922,045 B2
(45) Date of Patent: *Feb. 16, 2021

(54) CONTROL AND AUDIO SYSTEMS FOR A BOAT

(71) Applicant: MasterCraft Boat Company, LLC, Vonore, TN (US)

(72) Inventors: Darren S. Sheedy, Greenback, TN (US); David F. Ekern, Knoxville, TN (US)

(73) Assignee: MasterCraft Boat Company, LLC, Vonore, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/360,246

(22) Filed: Mar. 21, 2019

(65) Prior Publication Data
US 2019/0220242 A1 Jul. 18, 2019

Related U.S. Application Data

(63) Continuation of application No. 15/633,727, filed on Jun. 26, 2017, now Pat. No. 10,241,746.

(Continued)

(51) Int. Cl.
*H04R 5/02* (2006.01)
*G06F 3/16* (2006.01)
(Continued)

(52) U.S. Cl.
CPC .............. *G06F 3/165* (2013.01); *B63B 19/02* (2013.01); *B63B 34/00* (2020.02); *B63B 45/08* (2013.01);
(Continued)

(58) Field of Classification Search
CPC . H04R 2499/13; H04R 1/025; B60R 11/0217; B60R 2011/0005
(Continued)

(56) References Cited

U.S. PATENT DOCUMENTS 2,814,354 A 11/1957 Brettell
3,065,817 A 5/1961 Bailey
(Continued)

FOREIGN PATENT DOCUMENTS

DE 10 2008 013 979 A1 9/2009
DE 10 2013 006 068 A1 10/2014
(Continued)

OTHER PUBLICATIONS

"Surf System Advice Needed," The Malibu Crew; www.themalibucrew.com/index.php?/forums/topic/56510-surf-system-advice-needed/ (last visited Apr. 26, 2016).
(Continued)

*Primary Examiner* — George C Monikang
(74) *Attorney, Agent, or Firm* — Venable LLP

(57) ABSTRACT

A boat includes a dash positioned proximate a windshield at a first non-zero angle. A speaker is mounted under a top surface of the dash at a second non-zero angle. The speaker is positioned to direct sound emanating from the speaker through an opening in the dash and the windshield is configured to reflect the sound emanating from the speaker as reflected sound in an aft direction. The boat may also include an enclosure having a reflective surface positioned within a cavity formed between the deck and hull of the boat. A speaker, mounted within the enclosure, and the reflective surface are configured to reflect sound emanating from the speaker off of the reflective surface and through an opening of the enclosure.

18 Claims, 21 Drawing Sheets

Related U.S. Application Data

(60) Provisional application No. 62/492,926, filed on May 1, 2017.

(51) Int. Cl.
*B63B 45/08* (2006.01)
*H04R 3/04* (2006.01)
*B63B 49/00* (2006.01)
*B63H 21/21* (2006.01)
*B63B 34/00* (2020.01)
*B63B 19/02* (2006.01)
*H04R 1/02* (2006.01)
*H04R 1/34* (2006.01)
*H04R 5/04* (2006.01)
*B63B 79/00* (2020.01)
*B63B 34/70* (2020.01)
*B63B 3/48* (2006.01)

(52) U.S. Cl.
CPC .............. *B63B 49/00* (2013.01); *B63H 21/21* (2013.01); *H04R 1/025* (2013.01); *H04R 1/345* (2013.01); *H04R 3/04* (2013.01); *B63B 3/48* (2013.01); *B63B 34/70* (2020.02); *B63B 79/00* (2020.01); *B63H 2021/216* (2013.01); *H04R 5/04* (2013.01); *H04R 2430/01* (2013.01); *H04R 2499/13* (2013.01)

(58) Field of Classification Search
USPC .................................................. 381/86, 302
See application file for complete search history.

(56) References Cited

U.S. PATENT DOCUMENTS

| | | |
|---|---|---|
| 4,819,269 A | 4/1989 | Klayman |
| 4,889,208 A | 12/1989 | Sugihara |
| 5,031,220 A | 7/1991 | Takagi et al. |
| 5,617,480 A | 4/1997 | Ballard et al. |
| 5,966,453 A | 10/1999 | Koyano et al. |
| 6,139,170 A | 10/2000 | Wiggerman |
| 7,254,243 B2 | 8/2007 | Bongiovi |
| 7,343,020 B2 | 3/2008 | Thigpen |
| 8,073,156 B2 | 12/2011 | Hutt et al. |
| 8,229,136 B2 | 7/2012 | Bongiovi et al. |
| 8,284,955 B2 | 10/2012 | Bonglovi et al. |
| 8,462,963 B2 | 6/2013 | Bongiovi et al. |
| 8,488,818 B2 | 7/2013 | Biggs et al. |
| 8,565,449 B2 | 10/2013 | Bongiovi et al. |
| 8,705,765 B2 | 4/2014 | Bongiovi |
| 9,038,560 B1 | 5/2015 | Brendel |
| 9,195,433 B2 | 11/2015 | Bongiovi et al. |
| 9,264,004 B2 | 2/2016 | Bongiovi et al. |
| 9,281,794 B1 | 3/2016 | Bongiovi et al. |
| 9,344,828 B2 | 5/2016 | Bongiovi et al. |
| 9,348,904 B2 | 5/2016 | Bongiovi et al. |
| 9,350,309 B2 | 5/2016 | Bongiovi et al. |
| 9,397,629 B2 | 7/2016 | Bongiovi et al. |
| 9,398,394 B2 | 7/2016 | Bongiovi et al. |
| 9,413,321 B2 | 8/2016 | Bongiovi et al. |
| 9,564,146 B2 | 2/2017 | Bongiovi et al. |
| 2002/0081980 A1 | 6/2002 | Reus |
| 2004/0212906 A1 | 10/2004 | Heim et al. |
| 2005/0259831 A1* | 11/2005 | Hutt ............... H04R 1/345 381/86 |
| 2008/0137881 A1 | 6/2008 | Bongiovi |
| 2009/0086996 A1 | 4/2009 | Bongiovi et al. |
| 2009/0220108 A1 | 9/2009 | Bongiovi |
| 2009/0262963 A1 | 10/2009 | Inoue et al. |
| 2009/0296959 A1 | 12/2009 | Bongiovi |
| 2011/0176689 A1* | 7/2011 | Biggs ............... H04R 1/021 381/86 |
| 2012/0040574 A1 | 2/2012 | Grimes et al. |
| 2013/0148823 A1 | 6/2013 | Bongiovi et al. |
| 2015/0146099 A1 | 5/2015 | Bongiovi et al. |
| 2015/0297169 A1 | 10/2015 | Copt et al. |
| 2015/0297170 A1 | 10/2015 | Copt et al. |
| 2016/0044436 A1 | 2/2016 | Copt et al. |
| 2016/0240208 A1 | 8/2016 | Bongiovi et al. |
| 2016/0364838 A1 | 12/2016 | Stillman |
| 2017/0340910 A1 | 11/2017 | Lenz, Jr. et al. |

FOREIGN PATENT DOCUMENTS

| | | |
|---|---|---|
| EP | 1 596 627 A2 | 11/2005 |
| WO | 2007/065941 A1 | 6/2007 |
| WO | 2007/081712 A2 | 7/2007 |

OTHER PUBLICATIONS

2010 MasterCraft Viper System Manual.
MasterCraft 2011 Owner's Manual; pp. cover, i to x, 5-12 to 5-22, and 24-1 to 24-4.
2013 MasterCraft: X-Series, Models HV700 and HV450 Owner's Manual.
Supra 2015 Owner Manual, SC, SA, SE; pp. cover, 1, 2, 29-50, 91 and 92.
2017 Tige Boats Brochure; available at https://issuu.com/tigeboats/docs/tb-016-brochure-single-pages-small-; pp. 1-3, 8-13, 22, and 23.
2017 Tige Owner's Manual; available at https://issuu.com/tigeboats/docs/tb-404-2018-owners-manual-r8; pp. cover, 1, 2, 77-109.
Linc Panoray, 2017 Owner's Manual for Select Super Air Nautique Models.
2017 Malibu Owner Manual; pp. 1-11, 63-77, and 160-163.
Supra 2017 Owner Manual, SR, SA, SG, SE; pp. cover, 1, 2, 25-70.
Screen shots of "Command Center" video on Vimeo from Malibu Boats, https://vimeo.com/104666156.
Screen shots of "The Tige Clear User Experience" video on YouTube, Tige Bats, https://www.youtube.com/watch?v=bFcgdBszB-g.
Tige Boats—Touch 2. http://tige.com/features/touch-2 (last visited Jun. 29, 2017).
Screen shots of "Tige Touch2" video on YouTube, Tige Boats, https://www.youtube.com/watch?v=8XHImwjbKfl.
International Search Report and Written Opinion, dated Jul. 4, 2018, in Application No. PCT/US2018/029713.
International Preliminary Report on Patentability, dated Nov. 14, 2019, in Application No. PCT/US2018/029713.

* cited by examiner

CONTROL AND AUDIO SYSTEMS FOR A BOAT

CROSS-REFERENCE TO RELATED APPLICATION

This application is a continuation of U.S. patent aplication Ser. No. 15/633,727, filed Jun. 26, 2017. U.S. patent application Ser. No. 15/633,727 claims the benefit under 35 U.S.C. § 119(e) of U.S. Provisional Patent Application No. 62/492,926, filed May 1, 2017, and titled "Control and Audio Systems for a Boat." The foregoing applications are hereby incorporated by reference in their entireties and are made a part of this specification for all that they disclose.

FIELD OF THE INVENTION

This invention relates to control systems, including displays, and control methods for boats, in particular, recreational boats used for water sports. This invention also relates to audio systems for boats including control systems and control methods for the audio systems.

BACKGROUND OF THE INVENTION

Recreational boats are designed for multiple activities on the water, and in recent years, have become more complex. Boats may be designed for multiple water sports, such as water skiing, wakeboarding, wake surfing, tubing, and the like. Increasingly, multiple different pieces of equipment are included on the boat for each of these sports, contributing to the increased complexity. These boats are also designed for a variety of different users. Different users have different settings and preferences for the boat and equipment within each of the different water sports. Boats are also used for general cruising as well as transiting to and from the areas where the boat is used for water sports activities. In addition, these boats are often used for other leisure activities, such as swimming, sunbathing, or just relaxing on the water.

With such versatility comes added complexity in the controls, control systems, and displays for those controls and settings. There is thus desired improved, efficient, effective, and user-friendly control systems, including displays, for these recreational boats.

Audio systems, such as those used to play music, are often used with each of the various activities discussed above. Therefore, users desire audio systems, including speakers and control systems, that provide high-quality sound under each of the varying uses of the recreational boat.

SUMMARY OF THE INVENTION

In one aspect, the invention relates to a boat including a hull, a deck, a windshield, a dash, and a speaker. The hull includes a bow, a transom, and port and starboard sides, and the deck includes a floor. The windshield is mounted at a first non-zero angle with respect to the floor, and the dash is positioned proximate the windshield. The dash includes a top surface and an opening. The speaker is mounted under the top surface of the dash at a second non-zero angle with respect to the floor. The speaker is positioned to direct sound emanating from the speaker through the opening in the dash. The windshield is configured to reflect the sound emanating from the speaker as reflected sound, and the first non-zero angle of the windshield and the second non-zero angle of the speaker are configured to direct the reflected sound in an aft direction.

In another aspect, the invention relates to a boat including a hull, a deck, an enclosure, and a speaker. The hull includes a bow, a transom, and port and starboard sides, and the deck includes a floor and an opening. The deck is positioned above the hull forming a cavity between the deck and the hull. The enclosure is positioned within the cavity and includes a reflective surface. The reflective surface of the enclosure is positioned at a non-zero angle with respect to the floor. The speaker is mounted within the enclosure, and the speaker and the reflective surface of the enclosure are configured to reflect sound emanating from the speaker off of the reflective surface and through the opening.

These and other aspects of the invention will become apparent from the following disclosure.

BRIEF DESCRIPTION OF THE DRAWINGS

FIG. 17A is a screenshot of the center display in the standard view, and FIG. 17B is a screenshot of the center display in the expanded view.

FIG. 19A is a screenshot of the center display in the standard view, and FIG. 19B is a screenshot of the center display in the expanded view.

FIG. 20A is a screenshot of the center display in the standard view, and FIG. 20B is a screenshot of the center display in the expanded view.

DETAILED DESCRIPTION OF THE PREFERRED EMBODIMENTS

As used herein, directional terms forward (fore), aft, inboard, and outboard have their commonly understood meaning in the art. Relative to the boat, forward is a direction toward the bow, and aft is a direction toward the stern. Likewise, inboard is a direction toward the center of the boat and outboard is a direction away from it.

Figure 1:
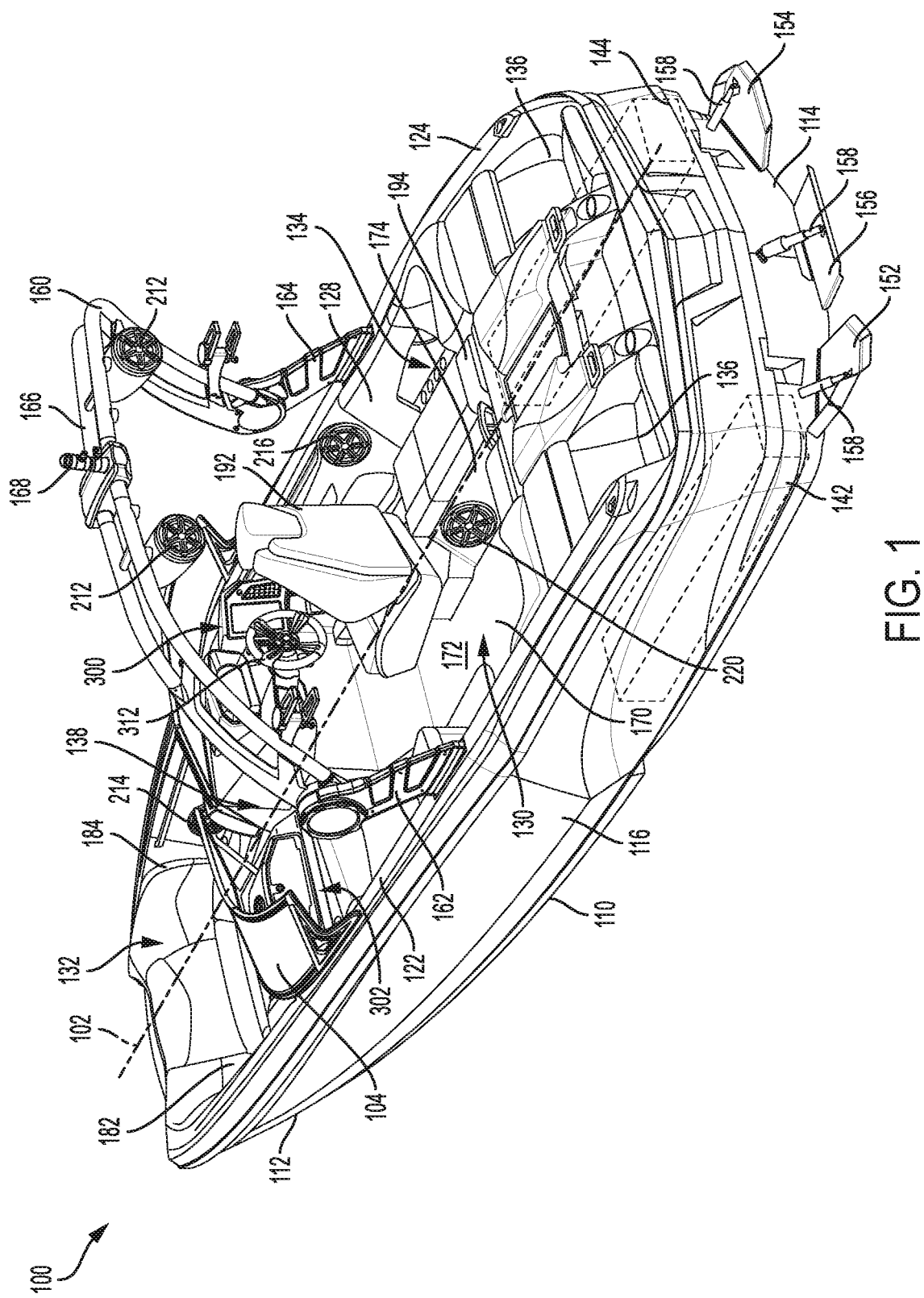
FIG. 1 shows a boat according to a preferred embodiment of the invention.
Figure 2:
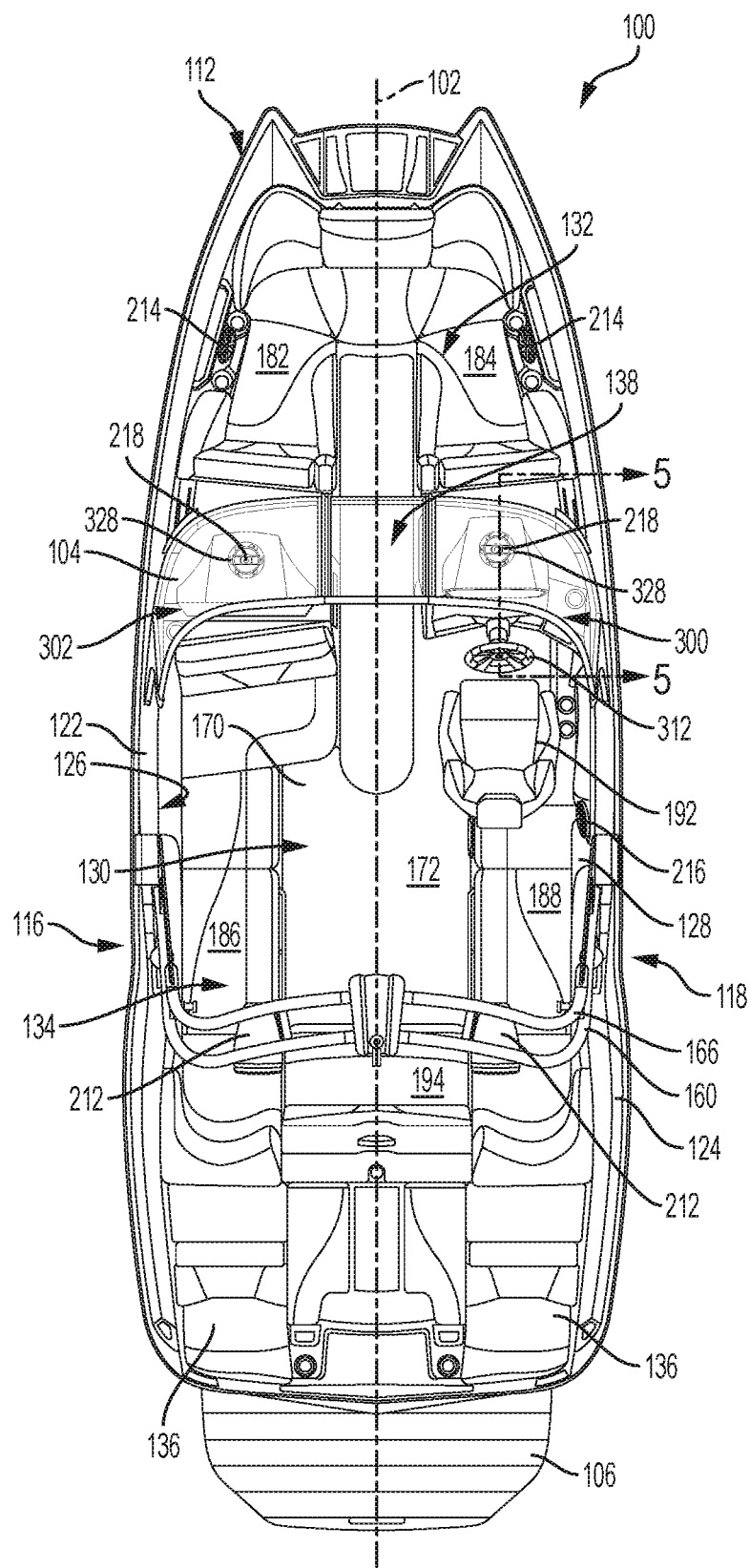
FIG. 2 is a top view of the boat shown in FIG. 1.

FIGS. 1 and 2 show a boat 100 in accordance with an exemplary preferred embodiment of the invention. The boat 100 includes a hull 110 with a bow 112, a transom 114, a port side 116, and a starboard side 118. The port and starboard sides 116, 118 have port and starboard gunwales 122, 124, respectively. The boat 100 has a centerline 102 running down the middle of the boat 100, halfway between the port and starboard sides 116, 118. Collectively, the bow 112, the transom 114, and the port and starboard sides 116, 118 define an interior 130 of the boat 100.

In the embodiment shown in FIGS. 1 and 2, the boat 100 is a bowrider having both a bow seating area 132 positioned in the bow 112 of the boat 100 and a primary seating area 134 (sometimes also referred to as the cockpit) positioned aft of a windshield 104. The boat 100 shown in FIGS. 1 and 2 also has a pair of aft-facing seats 136, such as those described in U.S. Pat. No. 9,650,117, which is incorporated by reference herein in its entirety. Also within the boat's interior 130 is a control console 300 for operating the boat 100. Here, the control console 300 is positioned on the starboard side of the boat 100 proximate to and aft of the windshield 104. The boat 100 is driven by a single inboard motor (engine 550 in FIG. 16) connected to a propeller (not shown) by a drive shaft (not shown). However, this invention can be utilized with other types of boats and propulsion systems, including but not limited to outboard motors, sterndrives, and the like. Although described in reference to a bowrider this invention may be used with any suitable boat including cuddies, center consoles, and cruisers, for example. The invention is also not limited to boats with single decks but may also be used with other boats that have multiple decks such as a flybridge.

A user may turn the boat 100 by rotating a steering wheel 312 located at the control console 300. Any suitable steering system that is appropriate for the propulsion system may be used. For example, when the boat 100 is an inboard, the boat may be turned by a main rudder positioned aft of the propeller or the rudder system shown and described in U.S. Pat. No. 9,611,009, which is incorporated by reference herein in its entirety.

The boat 100 includes a horizontal swim platform 106 attached to the transom 114 to make it easier for people to get into the water from the boat 100 or into the boat 100 from the water. A top view of the swim platform 106 is shown in FIG. 2, but the swim platform is omitted from FIG. 1 for clarity. The swim platform 106 should be capable of supporting a human and is preferably capable of supporting at least 500 lbs., and even more preferably 1250 lbs. The swim platform 106 may be constructed from any suitable material that may be used in a marine environment including, for example, fiberglass or teak. In this embodiment, the swim platform 105 is attached to the transom 114 of the boat 100 using two brackets screwed to the transom 114; however, the swim platform 106 may be attached to the transom 114 by any suitable means. While the swim platform 106 is described as an attachable/detachable platform, it is not so limited. For example, the swim platform 106 may be integrally formed with the stern of the boat 100.

The boat 100 may include the capability to add ballast 140. Ballast may be used to increase the weight and displacement of the boat 100 and increase the size of the wake for water sports such as wakeboarding or wake surfing. Any suitable means to add ballast may be used including ballast bags (sacks) or ballast tanks. The boat 100 shown in FIG. 1 includes three ballast tanks. Preferably, two ballast tanks are positioned in the stern of the boat near the bottom of the hull, one on each side of the boat (port ballast tank 142 and a starboard ballast tank 144), and a third ballast tank 146 (see FIG. 10) is positioned along the boat's centerline near the bottom of the hull, forward of the two stern ballast tanks 142, 144. Ballast bags may be used in addition to the ballast tanks 142, 144, 146 and may be plumbed into the ballast system of the boat 100. Preferably, the ballast bags are positioned above the stern ballast tanks 142, 144 in a compartment underneath the aft-facing seats 136. Both the ballast tanks 142, 144, 146 and the ballast bags operate similarly in that water may be pumped into the tank or bag by ballast pumps 148 (see FIG. 16) to add weight.

The boat 100 may be equipped with surf devices 152, 154, which may be used to shape the wake of the boat for wake surfing. Any suitable surf devices may be used including, for example, the port and starboard wake-modifying devices disclosed in U.S. Pat. No. 8,833,286, which is incorporated by reference herein in its entirety. Each of the port and starboard surf devices 152, 154 includes a plate-like member that is pivotably attached to the transom 114 of the boat 100. The plate-like members pivot about pivot axes to move between a non-deployed position and a deployed position. In this embodiment, the pivot axes are hinges. Here, the hinges are piano hinges that are welded to a leading portion of each plate-like member and attached to the transom 114 of the boat 100 using screws. However, any suitable pivotable connection may be used and may be affixed to the transom 114 of the boat 100 and the port and starboard surf devices 152, 154 using any suitable means, including but not limited to bolts, screws, rivets, welding, and epoxy. Each of the port and starboard surf devices 152, 154 also may include one or more downturned and/or upturned surfaces, such as downturned surfaces at the trailing edge of the plate-like members that are angled at a downward angle relative to the plate-like member. However, as noted above, any suitable surf device may be used and other suitable surf devices may include, for example, the port and starboard wake-modifying devices disclosed in U.S. Patent Application Publication No. 2015/0175242, which is incorporated by reference herein in its entirety.

As shown in FIG. 1, the boat 100 is also equipped with a central trim device (center tab 156) positioned to span the centerline 102 of the boat. Any suitable trim device may be used, but in this embodiment, the center tab 156 is a generally rectangular trim tab that is pivotably attached to the transom 114 of the boat 100. The center tab 156 includes a plate-like member and pivots about a pivot axis to move between a non-deployed position and a deployed position. Like the pivot axes of the surf devices 152, 154, the pivot axis of the center tab 156 may be any suitable pivotable connection affixed to the transom 114 of the boat 100.

Each of the surf devices 152, 154 and the center tab 156 is moveable between the deployed position and the non-deployed position by a drive mechanism 158. In the embodiment shown, one drive mechanism 158 is used for each surf device 152, 154 and the center tab 156, allowing them to be independently operated. Each of the drive mechanisms 158 shown in this embodiment is a linear actuator. The linear actuator preferably is an electric linear actuator, such as one available from Lenco Marine. One end of the linear actuator is connected to the transom 114 of the boat 100 and the other end is connected to the surf device 152, 154 or center tab 156. Any suitable means may be used to move the surf devices 152, 154 and the center tab 156 between the deployed and non-deployed positions, including but not limited to hydraulic linear actuators, gas assist pneumatic actuators, and electrical motors.

The boat 100 is also equipped with an apparatus for towing a water sports participant. As shown in FIGS. 1 and 2, the towing apparatus is a tower 160 that is particularly used for towing a wakeboarder. Any suitable tower 160 may be used including, for example, those described in U.S. Pat. No. 9,580,155 and U.S. patent application Ser. No. 15/628,791, which are incorporated by reference herein in their entireties. The tower 160 includes two legs: a port leg 162 and a starboard leg 164. The port leg 162 is attached on the port side of the centerline 102 of the boat 100, and the starboard leg 164 is attached on the starboard side of the centerline 102 of the boat 100. Preferably, the port and starboard legs 162, 164 are attached to the port gunwale 122 and to the starboard gunwale 124, respectively. The tower 160 also includes a header 166. The header 166 is connected to an upper portion of each of the two legs 162, 164 and spans the interior 130 of the boat 100 at a height suitable for passengers to pass underneath while standing. In addition, the tower 160 has a tow-line-attachment structure 168 at an upper portion of the tower 160 (the header 166 in this embodiment). This tow-line-attachment structure 168 may be used to connect a tow-line suitable for towing a water sports participant, such as a wakeboarder. Any suitable tow-line-attachment structure may be used, including but not limited to the integrated light and tow-line-attachment assembly disclosed in U.S. Pat. No. 6,539,886, which is incorporated by reference herein in its entirety.

The boat 100 has a deck 170 which includes a floor 172. Passenger seating, such as port and starboard bench seating 182, 184, 186, 188 in both the bow seating area 132 and primary seating area 134, may be constructed on elevated portions (seat support structures 174) of the deck 130. As used herein, these portions are elevated with respect to the level of the floor 172. Other seating locations within the boat's interior 130 include a captain's chair 192 at the control console 300 and a reversible bench seat 194. Although the invention is described with reference to a particular seating arrangement, different seating arrangements are contemplated to be within the scope of the invention.

The deck 170 also includes two support structures 176, 178 (elevated portions of the deck), one on the starboard side 176 of the boat 100 and one on the port side 178 of the boat 100. As shown in more detail in FIG. 3, the support structure on the starboard side 176 is the control console support and is used to support and enclose various controls for operating the boat 100 (discussed further below). As shown in more detail in FIG. 4, the support structure 178 on the port side of the boat 100 supports a passenger side console 302. The support structure 178 on the port side of the boat 100 is opposite the control console support 176. Together the two support structures 174, 176 separate the bow seating area 132 from the primary seating area 134 as seen in FIG. 2. A walkway 138 connects the bow seating area 132 with the primary seating area 134 and separates the two support structures 174, 176.

The windshield 104 is mounted, in part, on forward portions of the support structures 174, 176. In this embodiment, the windshield 104 is mounted directly to a forward portion of the support structures 174, 176 and the gunwales 122, 124. Near the walkway 138 or centerline 102 of the boat 100, the windshield 104 is oriented such that it is perpendicular to the centerline 102 of the boat 100. Moving outboard from the centerline 102 of the boat 100, the windshield 104 is curved such that it smoothly transitions to an orientation that is parallel to or co-planar with the port or starboard side of the hull 116, 118 near the gunwales 122, 124, which in this embodiment is generally parallel to the centerline 102 of the boat 100.

The boat 100 also includes an audio system 200. Sound is output from the audio system 200 by speakers 210 positioned throughout the boat 100 (see FIG. 21). The speakers 210 may be located in any suitable location in or on the boat 100. In this embodiment, at least two speakers are attached to the tower 160 and are positioned to direct sound in an aft direction. These are referred to herein as tower speakers 212 and may be used, for example, to project sound outside of the boat and, when applicable, to a watersport participant, such as a wakeboarder, surfer, or skier. Preferably, the tower speakers 212 are attached to the underside of the header 166.

Speakers may also be positioned within the interior 130 of the boat 100 to provide sound to the occupants of the boat. For example, two speakers may be located in the bow 112 of the boat (bow speakers 214) to project sound in the bow seating area 132, and two speakers (cockpit speakers 216) may be located in the primary seating area 134 to project sound into the primary seating area 134. The interior 130 of the boat 100 includes port and starboard sidewalls 126, 128. The bow speakers 214 and cockpit speakers 216 may be located on port and starboard sidewalls 126, 128 and below the gunwales 122, 124.

With the bow speakers 214 and cockpit speakers 216 located below the gunwales 122, 124, much of the sound emanating from these speakers 214, 216 will be projected at a level that is lower than an occupant's ear. Even when seated, an occupant's head (for the typical adult and many school age children) will be above the level of the gunwales 122, 124 and thus the speakers 214, 216. It is desirable, however, to position speakers that direct sound toward the occupant's ears. The inventors have found that this can be accomplished by positioning the speakers such that sound is reflected off of surfaces within the boat 100 and toward the occupant's ears. In this embodiment, two dash speakers 218 are positioned to reflect the sound off the windshield 104 in an aft direction. One dash speaker 218 is located in the control console 300 and the other is located in the passenger side console 302, although any suitable number of dash speakers 218 may be used, including multiple speakers located in each console 300, 302.

The speakers 212, 214, 218 are preferably marine grade speakers designed for the marine environment (e.g., sealed electrical components and materials suitable for the marine environment). For example, the speakers 212, 214, 218 may be high fidelity marine grade speakers with cast aluminum baskets and a titanium horn. The speakers may be round speakers having a diameter of 7 inches or 8.5 inches. Any suitable speakers 212, 214, 218 may be used.

Figure 3:
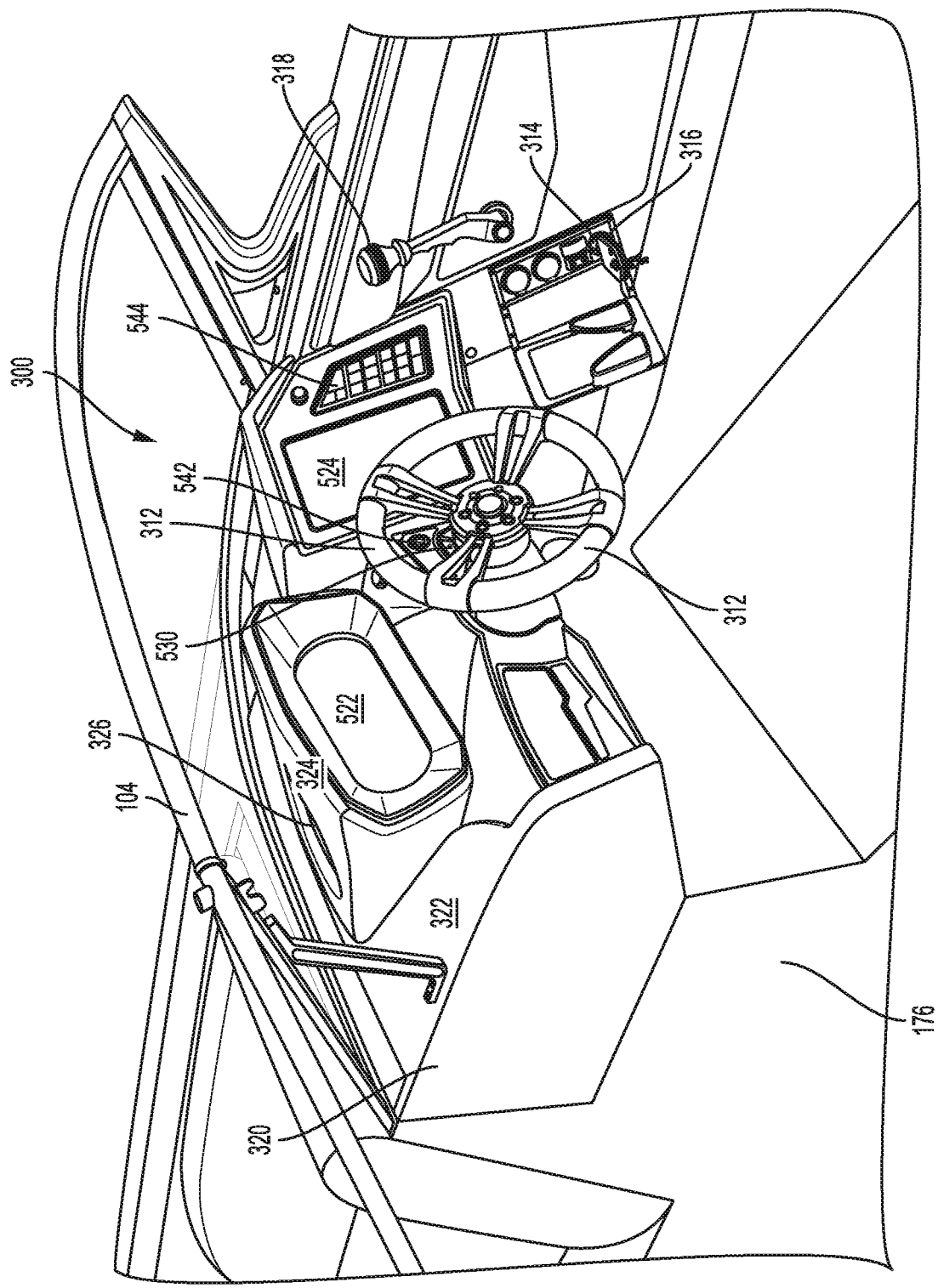
FIG. 3 is a perspective view of the control console of the boat shown in FIG. 1.
Figure 5:
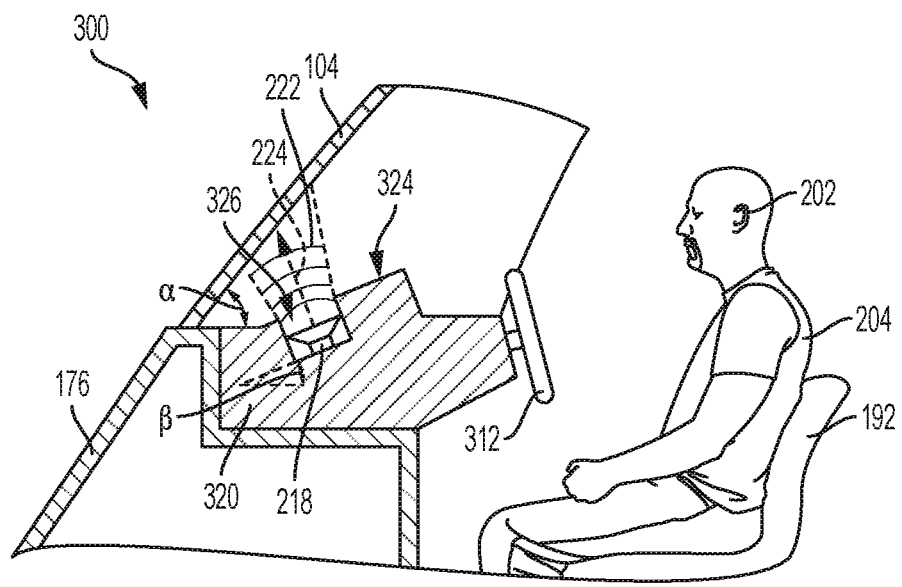
FIG. 5 is a cross-section view of the control console taken along line 5-5 in FIG. 2.

A detailed view of the control console 300 is shown in FIG. 3, and FIG. 5 is a cross-section view of the control console taken along line 5-5 in FIG. 2. A dash 320 houses instrumentation, displays, and controls for the boat 100, as will be discussed in further detail below. The dash 320 is supported by the control console support 176 and is positioned proximate the windshield 104. The dash 320 includes at least one upper surface 322. In the embodiment shown in FIG. 3, the dash 320 has multiple upper surfaces 322, 324 that are not co-planar with each other. In this embodiment, a generally horizontal upper surface 322 is generally parallel to the floor 172, and an angled upper surface 324 is slanted at a non-zero angle relative to the floor 172.

Figure 4:
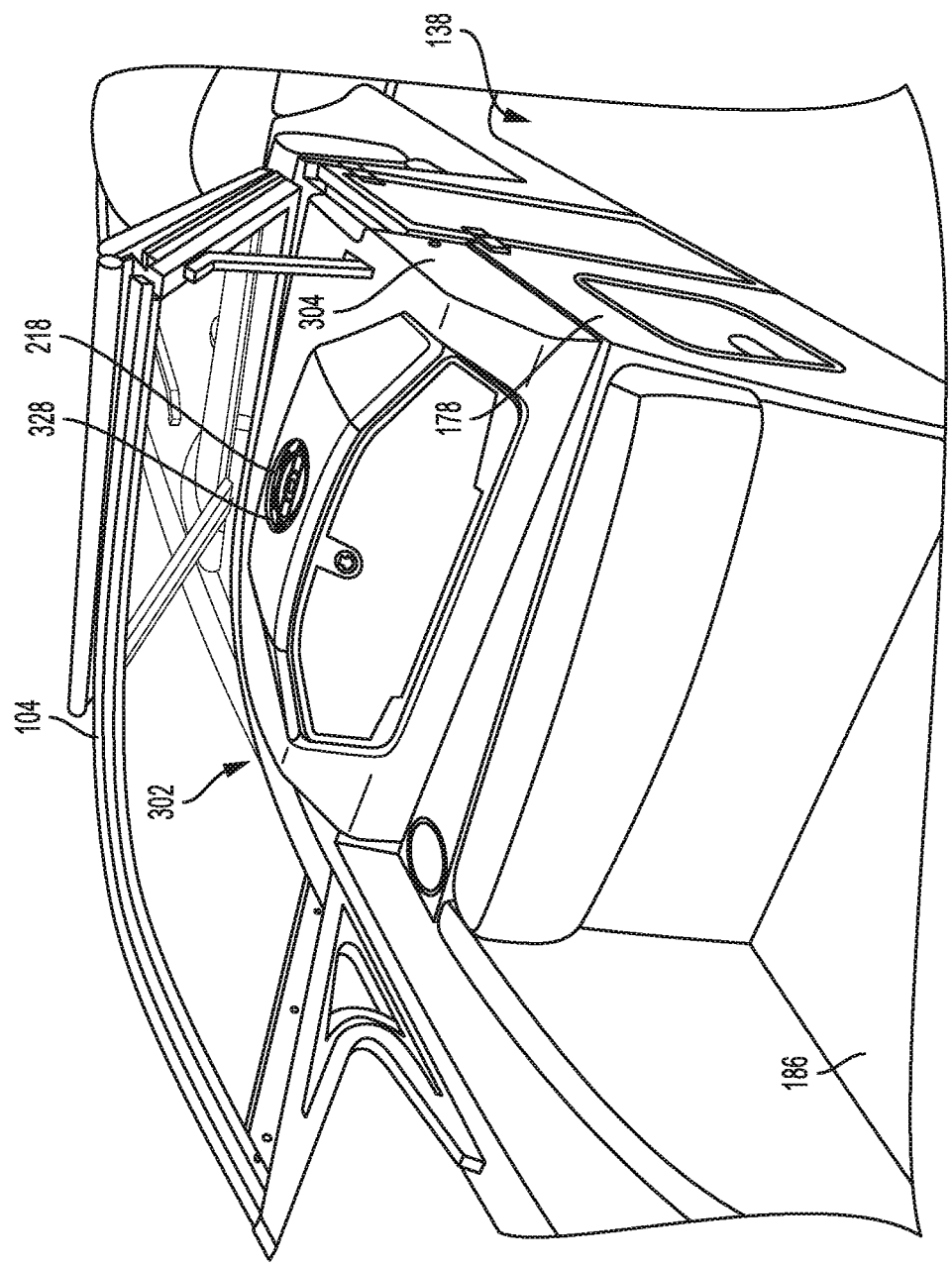
FIG. 4 is a perspective view of the passenger side console of the boat shown in FIG. 1.

A detailed view of the passenger side console 302 is shown in FIG. 4, and like the control console 300, the passenger side console 302 also includes a dash 304 that is positioned proximate the windshield 104. Although the following description describes the dash speaker 218 located in the control console 300, the description is also applicable to the dash speaker 218 located in the passenger side console 302.

The dash speaker 218 is positioned below at least one of the top surfaces 322, 324 of the dash 320. In this embodiment, the dash speaker 218 is positioned below the angled upper surface 324, and the angled upper surface 324 includes an opening 326 for the dash speaker 218. The opening 326 is configured to allow sound waves emanating from the dash speaker 218 to pass through the angled upper surface 324 of the dash 320. In this embodiment, a grille 328 covers the opening 326 (see FIG. 2). The grille 328 protects the speaker and can be a decorative element on the dash 320. The grille 328 preferably is designed to minimize any effect of the grille 328 on the sound emanating from the dash speaker 218. The grille 328 is omitted from FIG. 5 for clarity.

The windshield 104 extends upward from the generally horizontal upper surface 322 of the dash 320 and, in this embodiment, from the control console support 176, to which the windshield 104 is mounted. The windshield 104 is slanted with respect to the floor 172 (or the generally horizontal upper surface 322 of the dash 320). In this embodiment, the windshield 104 is inclined at a non-zero angle (angle α) with respect to the floor 172 (or the generally horizontal upper surface 322 of the dash 320). Preferably angle α is between 30 degrees and 45 degrees. As a result of the slant, the windshield 104 extends over the opening 326 in the dash 320. In this embodiment, the portion of the windshield 104 that extends over the opening 326 in the dash 320 is a generally planar surface, but it can also be curved. This curvature not only includes curvature in the inboard and outboard directions (e.g., as the windshield 104 transitions between the orientation of the windshield 104 near the centerline 102 of the boat and the orientation of the windshield 104 at the gunwales 122, 124), but also curvature in the fore and aft directions.

Figure 6:
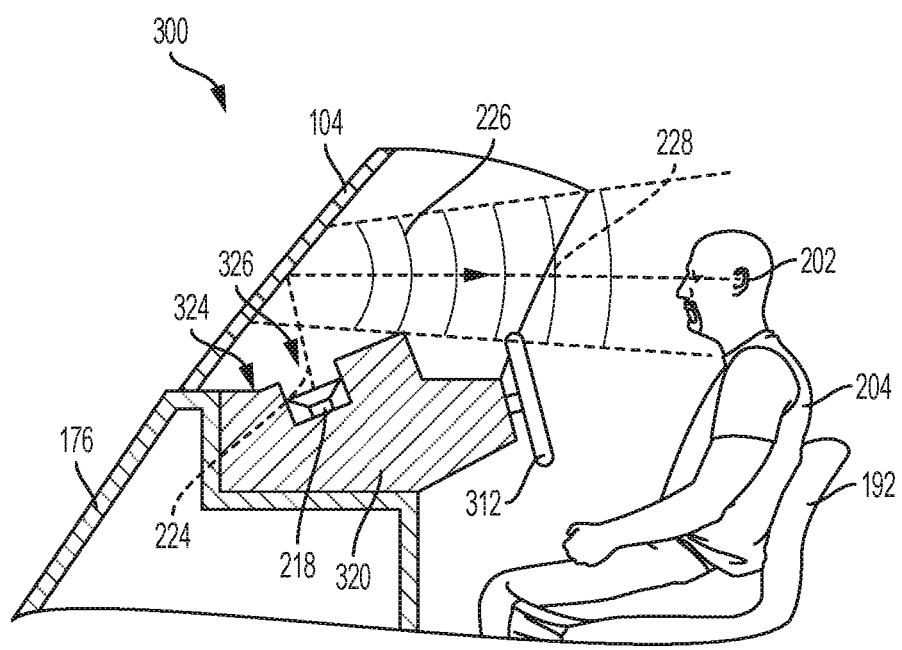
FIG. 6 is the cross-section view shown in FIG. 5 illustrating reflected sound waves.

The dash speaker 218 is oriented to project sound upward, through the opening 326 and toward the windshield 104. As can be seen in FIG. 5, the sound waves 222 emanating from the speaker pass through the opening 326 and toward the windshield 104 in a direction represented by a centerline 224 of the sound waves 222. As shown in FIG. 6, the sound waves 222 then reflect off of the windshield 104 as reflected sound waves 226 in a direction represented by a centerline 228 of the reflected sound waves 226. The reflected sound waves 226 are reflected off the windshield 104 in an aft direction and into the primary seating area 134. For clarity in the following descriptions and figures, centerlines (such as centerlines 224, 228) will be used illustrate and describe the behavior of sound waves emanating from the various speakers discussed herein.

The relative orientation of the dash speaker 218 and the windshield 104 can be controlled so that the reflected sound waves 226 are directed toward the ears 202 of a person 204 located in a listening position. As shown in FIGS. 5 and 6, the listening position may be, for example, the captain's chair 192 at the control console 300, and in particular, the ear level of a person 204 seated in the captain's chair 192. Preferably, the ear level of a person 204 seated in the captain's chair 192 (or other position) is set in a range from the sitting height of the fifth percentile female to the sitting height of the ninety-fifth percentile male, which is preferably between 30 inches and 60 inches above the floor. More preferably, the sound is directed to a location that is between 38 inches and 54 inches above the floor. Other suitable listening positions within the boat 100 include the reversible bench seat 194 or the port and starboard bench seating 186, 188 in the primary seating area 134, and in particular, the ear level of a person seated in one of those locations.

The dash speaker 218 is preferably inclined relative to the floor 172 (or the generally horizontal upper surface 322 of the dash 320). In this embodiment, dash speaker 218 is inclined at a non-zero angle (angle β) with respect to the floor 172 (or the generally horizontal upper surface 322 of the dash 320). Preferably angle β is between 1 degree and 20 degrees, and more preferably it is between 5 degrees and 15 degrees. Because the angle of incident sound waves 222 equals the angle of reflected sound waves 226, the angle of the dash speaker 218 (angle β) and the angle of the windshield 104 (angle α) are coordinated to direct the reflected sound waves 226 to the desired listening position. In addition to directing the sound for an improved listening experience, inclining the dash speaker 218 has a number of other benefits. For example, water is a concern in the marine environment. Inclining the dash speaker 218 at a non-zero angle (angle β) with respect to the floor 172 can help prevent water damage to the speaker 218 because inclining the speaker 218 prevents or minimizes water from pooling therein.

Although this embodiment has been described with a single dash speaker 218 under the dash 320, any suitable number of speakers may be used. When multiple dash speakers 218 are used in the same console 300, the dash speakers 218 may be inclined at the same angle (angle β) or different angles. They may be positioned and inclined (angle β) such that the reflected sound waves 226 are directed toward the same listening position or toward different listing positions. When directed toward the same listening position, one speaker may be directed toward the left ear of a person 204 seated in the listening position and another speaker may be directed toward the right ear of the person 204 to provide stereo sound. When multiple dash speakers 218 are used, the sound emanating from each speaker 218 may be directed through the same opening 326 or through different openings 326 formed in the dash 320.

Figure 7:
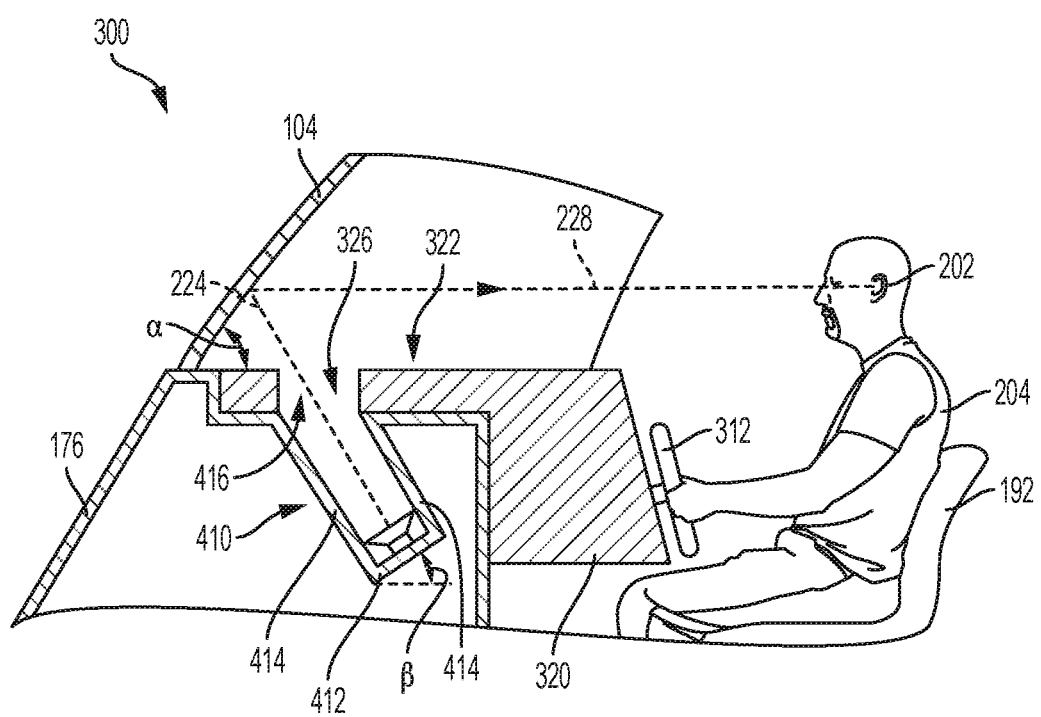
FIG. 7 is a cross-section view of the control console taken along line 5-5 in FIG. 2 showing an alternative configuration of the control console.

In FIGS. 5 and 6, the dash speaker 218 is located within the dash 320, below the upper surface 324 of the dash 320. FIG. 7 is a cross-section taken along line 5-5 in FIG. 2 showing an alternative assembly of the control console 300 and, in particular, the dash speaker 218. In this embodiment, the dash speaker 218 is mounted below the generally horizontal upper surface 322, at the bottom 412 of a dash speaker enclosure 410. The enclosure 410 may be used, for example, to provide aesthetic or cosmetic benefits, in addition to providing long-term environmental protection. In the embodiment shown in FIG. 7, the dash speaker enclosure 410 is integrally formed in the deck 170 and, in particular, the control console support 176. However, the enclosure 410 is not limited to this construction and may, for example, be a separate assembly mounted to the control console support 176 or dash 320.

Figure 8A:
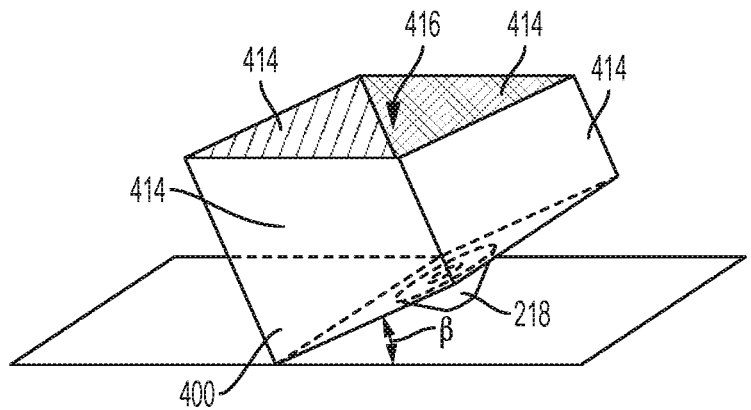
FIG. 8A is a perspective view of a configuration of the dash speaker enclosure shown in FIG. 7.

The dash speaker 218 and dash speaker enclosure 410 are shown in FIG. 8A. In this embodiment, the dash speaker enclosure 410 has a generally cubic structure with each of four sidewalls 414 intersecting an adjacent sidewall 414 and the bottom 412 at a right angle. The bottom 412 is inclined at the angle β with respect to the floor. The top of the dash speaker enclosure 410 includes an opening 416, and the dash speaker enclosure 410 is positioned to allow the sound waves 222 emanating from the speaker 218 to pass out of the enclosure 410 through the opening 416 in the top of the enclosure 410 and the opening 326 in the dash 320. Although shown as a generally cubic structure, the dash speaker enclosure 410 may have any suitable geometric shape including, for example, a cylindrical shape.

Figure 8B:
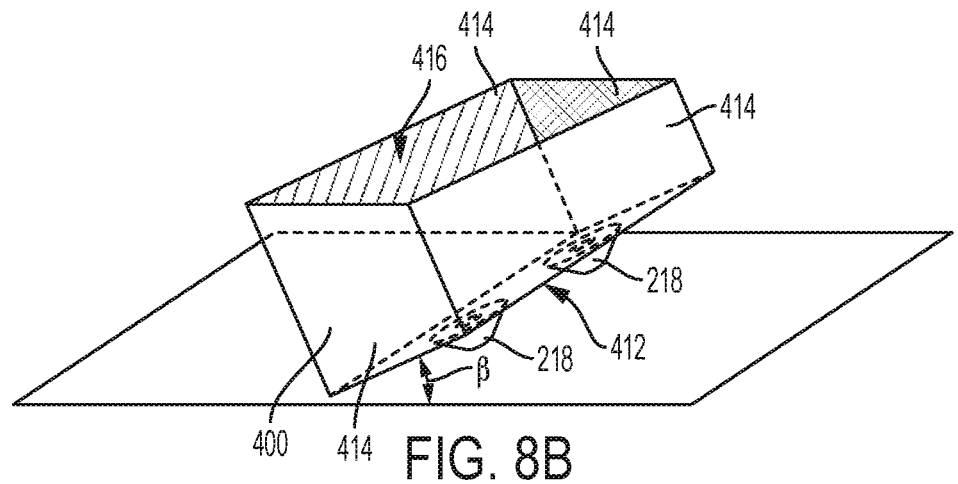
FIG. 8B is a perspective view of another configuration of the dash speaker enclosure shown in FIG. 7.
Figure 8C:
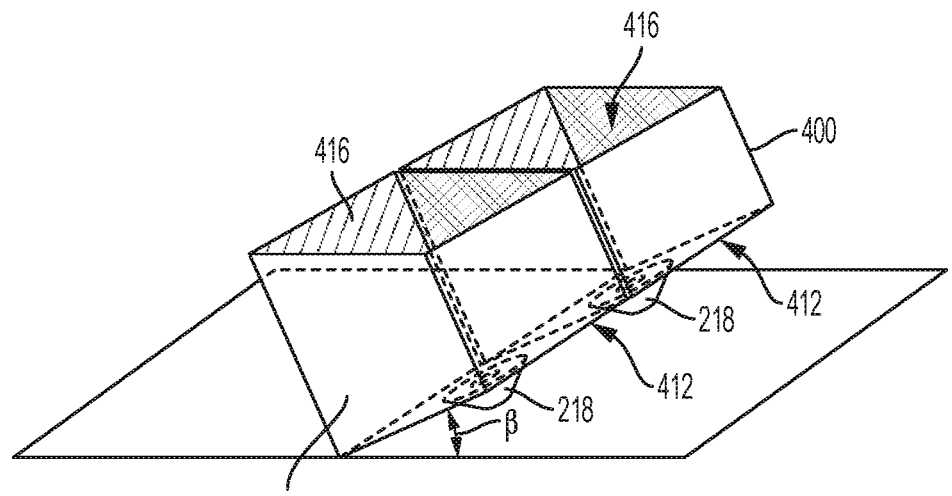
FIG. 8C is a perspective view of a further configuration of the dash speaker enclosure shown in FIG. 7.

As discussed above, multiple dash speakers 218 may be positioned in the control console 300. FIGS. 8B and 8C show alternative dash speaker enclosures 410 and provide examples of how multiple speakers 218 may be used with the dash speaker enclosure 410. In FIG. 8B, two dash speakers 218 are mounted to the bottom 412 of the same enclosure 410, and in FIG. 8C, each speaker 218 is mounted to the bottom 412 of a different enclosure 410.

Figure 9:
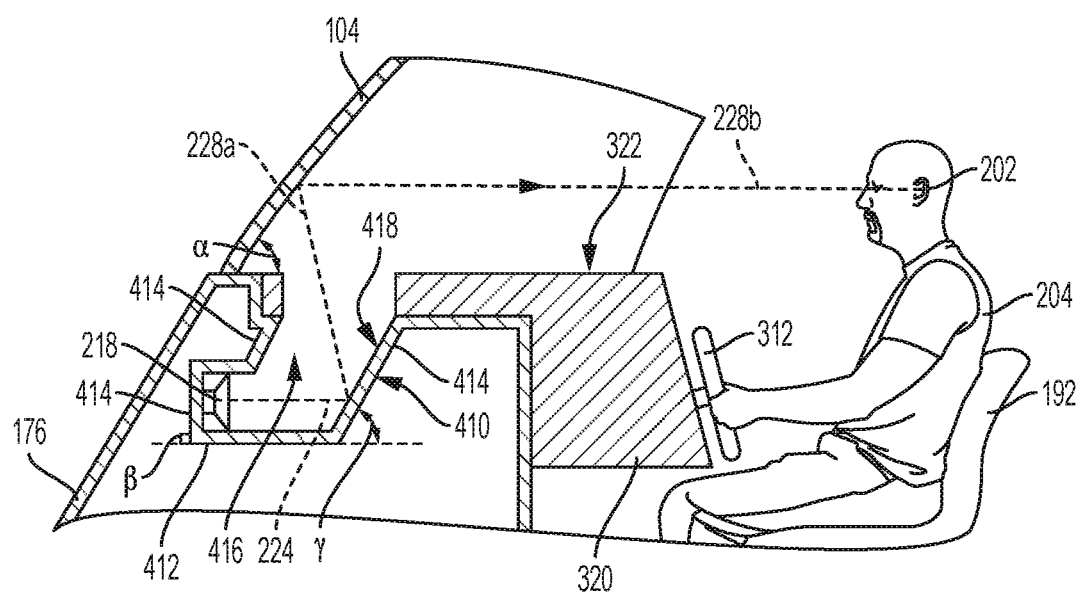
FIG. 9 is a cross-section of the control console taken along line 5-5 in FIG. 2 showing another alternative configuration of the control console.

The sound waves emanating from the dash speaker 218 may be reflected off of other surfaces in addition to the windshield 104 before reaching the listening position. FIG. 9 is a cross-section taken along line 5-5 in FIG. 2 showing another alternative dash speaker enclosure 410. In this embodiment, the dash speaker 218 is mounted on one of the sidewalls 414 of the enclosure 410, instead of the bottom 412. Here the dash speaker 218 is mounted at an inclination angle β that is perpendicular to the floor. The sound waves emanating from the speaker 218 travel in the direction indicated by centerline 224. Before being reflected off of the windshield 104, the sound waves are reflected off of a reflective surface 418 and travel in the direction indicated by centerline 228a. In this embodiment, the reflective surface 418 is an inner surface of one of the sidewalls 414 of the enclosure the enclosure 410. After being reflected off of the reflective surface 418, the sound waves travel through the openings 326, 416 in both the enclosure 410 and the dash 320, and are then reflected off of the windshield 104 aft toward a listening position (in the direction indicated by centerline 228b). The angle (angle γ) of the reflective surface 418 is coordinated with the angle of the dash speaker 218 (angle β) and the angle of the windshield 104 (angle α) to direct the reflected sound waves 226 to the desired listening position. In this embodiment, the angle (angle γ) of the reflective surface 418 is at a non-zero angle with respect to the floor 172.

Using an enclosure to direct the sound to listening positions may be useful in other speaker applications, including, for example, a subwoofer 220. Subwoofers 220 are often large and heavy, which limits the mounting locations for the subwoofers 220 when directly emitting sound to the passenger compartments such as the bow and primary seating areas 132, 134. These mounting structures, such as the seat support structures 174, likewise impose limitations on the size of the subwoofer 220 they are capable of supporting. The distribution of weight in a boat, particularly a boat used for wake surfing and wakeboarding, is also an important consideration. A subwoofer enclosure 420 may thus be advantageous, for example, because it enables flexibility in the positioning and mounting locations of the subwoofer 220.

Figure 10:
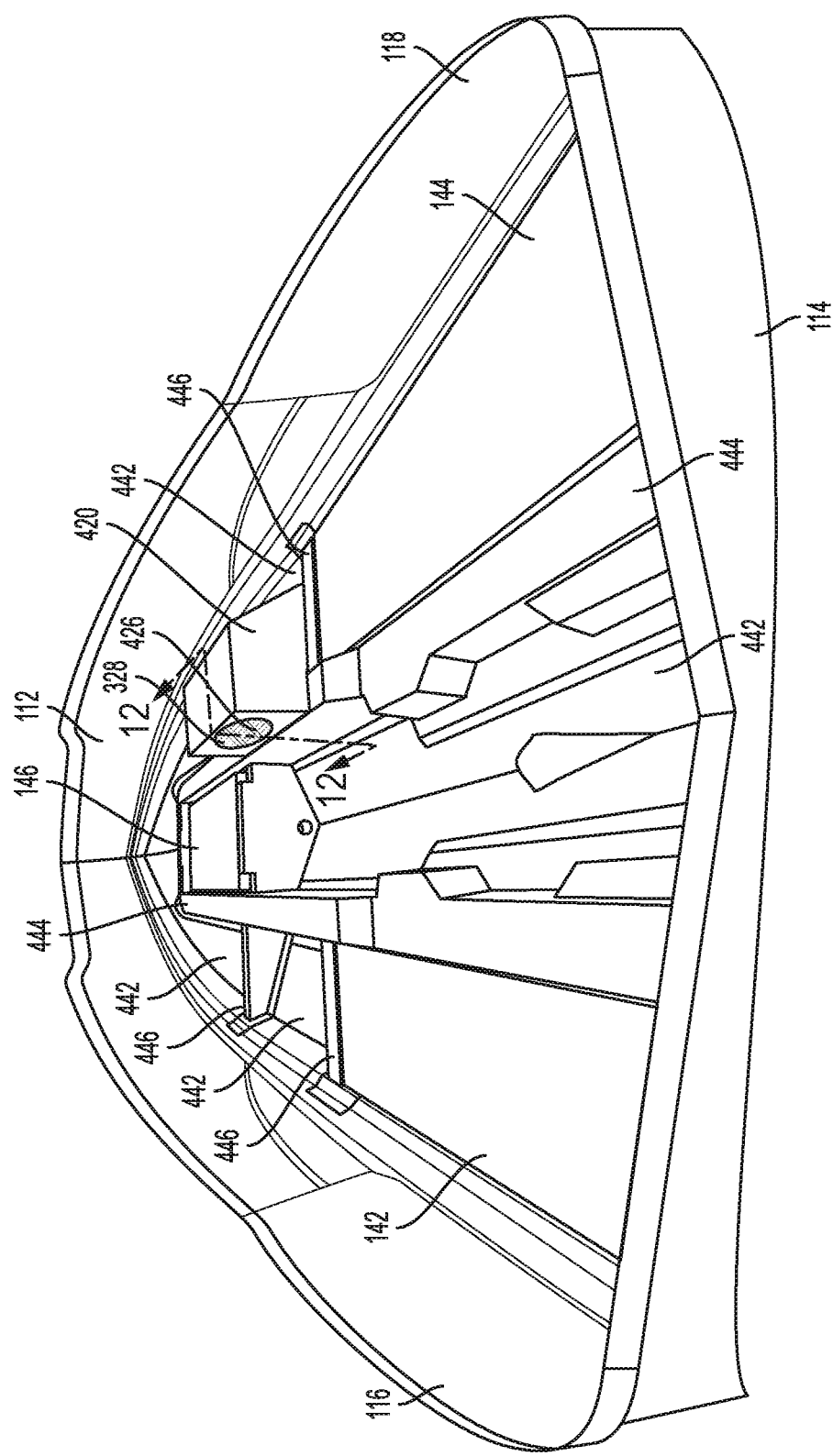
FIG. 10 shows the hull of the boat shown in FIG. 1 with the deck removed.

One suitable location for a subwoofer enclosure 420 is in a cavity 442 formed between the deck 170 and the hull 110. FIG. 10 shows the hull 110 of the boat 100 with the deck 170 removed. (Also visible in FIG. 10 are the two stern ballast tanks 142, 144 and the third ballast tank 146.) The longitudinal stringers 444 and athwartship stringers 446 can be considered to create multiple cavities 442 between the deck 170 and the hull 110. A subwoofer enclosure 420 may be suitably located in one of these cavities 442. Placing the subwoofer 220 in one of these cavities positions a heavy subwoofer 220 low in the boat 100, lowering the boat's center of gravity.

Figure 11:
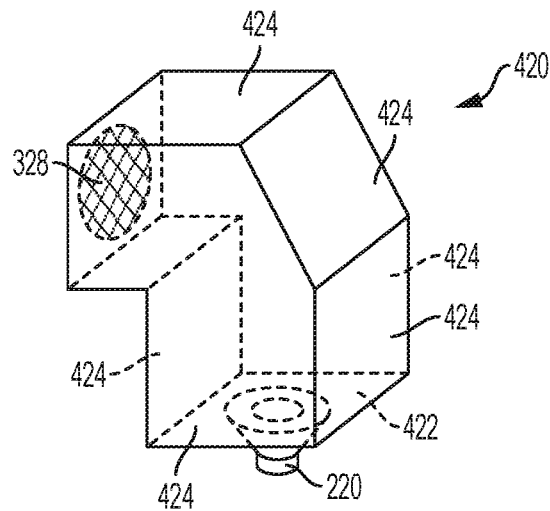
FIG. 11 is a perspective view of the subwoofer enclosure.
Figure 12:
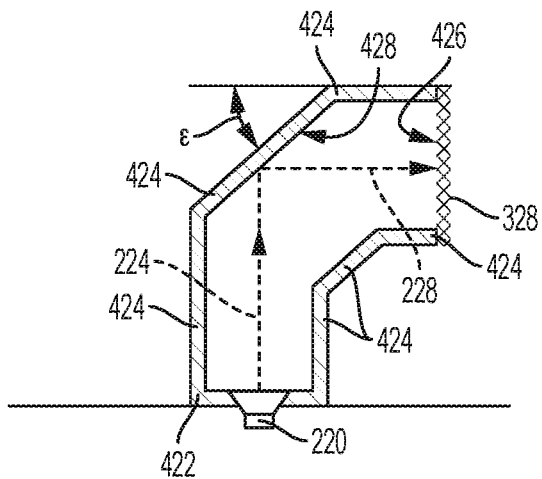
FIG. 12 is a cross-section of the subwoofer enclosure shown in FIG. 11 taken along plane 12-12 in FIG. 10.
Figure 13:
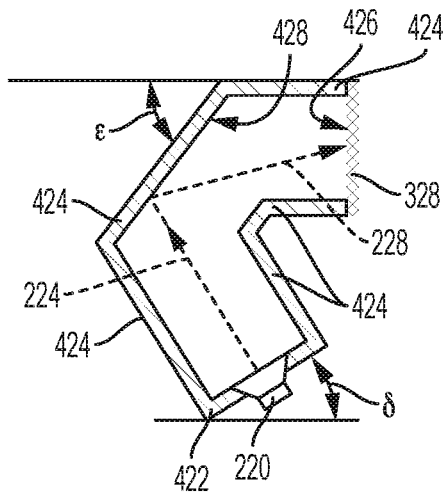
FIG. 13 is a cross-section of an alternative subwoofer enclosure taken along plane 12-12 in FIG. 10.

The subwoofer enclosure 420 is shown in FIG. 11, and FIG. 12 is a cross-section of the subwoofer enclosure 420 taken along plane 12-12 in FIG. 10. The subwoofer enclosure may have any suitable geometry, but in this embodiment, the subwoofer enclosure 420 has the geometry of an inverted L-shape. The subwoofer enclosure has a bottom 422, walls 424, and an opening 426. A grille 328 may be formed over the opening 426. The subwoofer 220 is mounted at the bottom 422 of the subwoofer enclosure 422. In this embodiment, the subwoofer 220 (and also the bottom 422 of the subwoofer enclosure 420) is mounted to the boat 100 such that the subwoofer 220 is generally parallel to the floor 172 of the boat. However, the subwoofer 220 (and also the bottom 422 of the subwoofer enclosure 420) may be mounted at a non-zero angle (angle δ) relative to the floor 172, as shown in FIG. 13, for example. FIG. 13 is a cross-section of an alternative subwoofer enclosure 420 taken along plane 12-12 in FIG. 10.

The sound waves emanating from the subwoofer 220 travel in the direction indicated by centerline 224, which in the embodiments shown in FIGS. 12 and 13 is upward. The sound waves are then reflected off of a reflective surface 428 and travel in the direction indicated by centerline 228. In this embodiment, the reflective surface 428 is an inner surface of one of the walls 424 of the enclosure the enclosure 420. The reflected sound waves then travel in a direction indicated by centerline 228 through the opening 326 and into the primary seating area 134 as can be seen in FIG. 1. The angle (angle ε) of the reflective surface 428 is coordinated with the angle of the subwoofer 220 (angle δ) to direct the sound waves to the desired location. In this embodiment, the angle (angle ε) of the reflective surface 428 is at a non-zero angle with respect to the floor 172.

Figure 14:
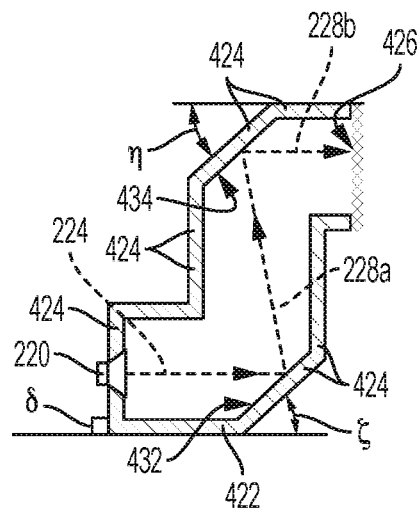
FIG. 14 is a cross-section of another alternative subwoofer enclosure taken along plane 12-12 in FIG. 10.

The sound waves emanating from the subwoofer 220 may be reflected off of multiple surfaces before reaching the desired location. FIG. 14 is a cross-section of another alternative subwoofer enclosure 420 taken along plane 12-12 in FIG. 10. In this embodiment, the sound waves emanating from the subwoofer 220 are reflected off of two reflective surfaces 432, 434, which are two inner surfaces of the walls 424 of the subwoofer enclosure 420. As with the previous embodiments, the reflective surfaces 432, 434 are not limited to walls 424 of the subwoofer enclosure 420 and may be other suitable surfaces on or within the boat 100.

The subwoofer 220 is mounted on a wall 424 of the enclosure with an inclination angle (angle δ) that is perpendicular to the floor 172. The sound waves emanating from the subwoofer 220 are directed in the direction indicated by centerline 224 and are reflected off of the first reflective surface 432 in a direction indicated by centerline 228a. The first reflective surface 432 is oriented at a non-zero angle (angle ζ) with respect to the floor 172. The sound waves are then reflected off of the second reflective surface 434 (in a direction indicated by centerline 228b), through the opening 426, and into the primary seating area 134. The second reflective surface 434 is oriented at a non-zero angle (angle η) with respect to the floor 172. The angles (angles ζ and η) of the reflective surfaces 432, 434 are coordinated with each other and the angle of the subwoofer (angle δ) to direct the reflected sound waves to the desired listening position.

Figure 15:
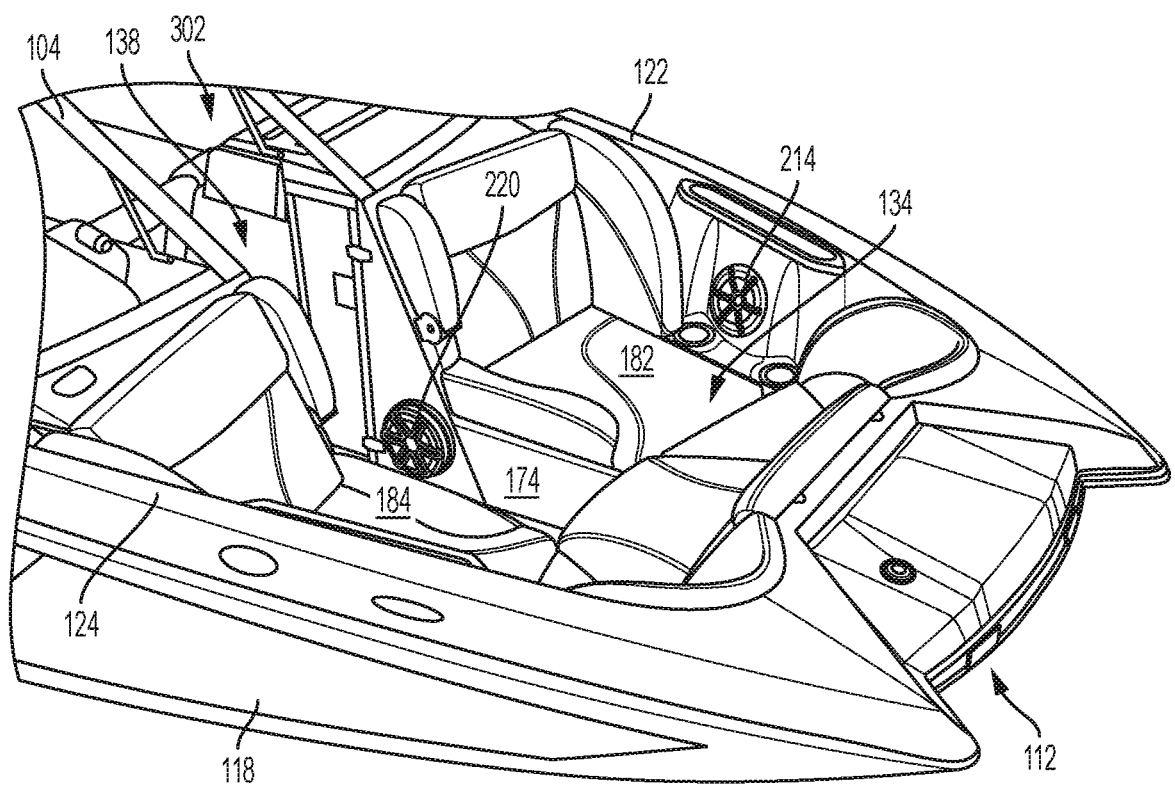
FIG. 15 is a perspective view of the bow of the boat shown in FIG. 1.

The subwoofer 220 and subwoofer enclosure 420 may be configured to direct sound into other seating areas and listening positions in the boat 100, including for example the bow seating area 132 as shown in FIG. 15. Here, the enclosure may be positioned in a cavity 442 to the port side of the third ballast tank 146. Instead of being located in the cavity and directing sound upward, the subwoofer enclosure 420 may be arranged such that it is above the deck 170 and may be included in the passenger side console 302. In this embodiment, for example, the sound waves emanating from the subwoofer 220 may be initially directed forward and then reflected off of reflective surface 418 into the bow seating area 132.

Figure 16:
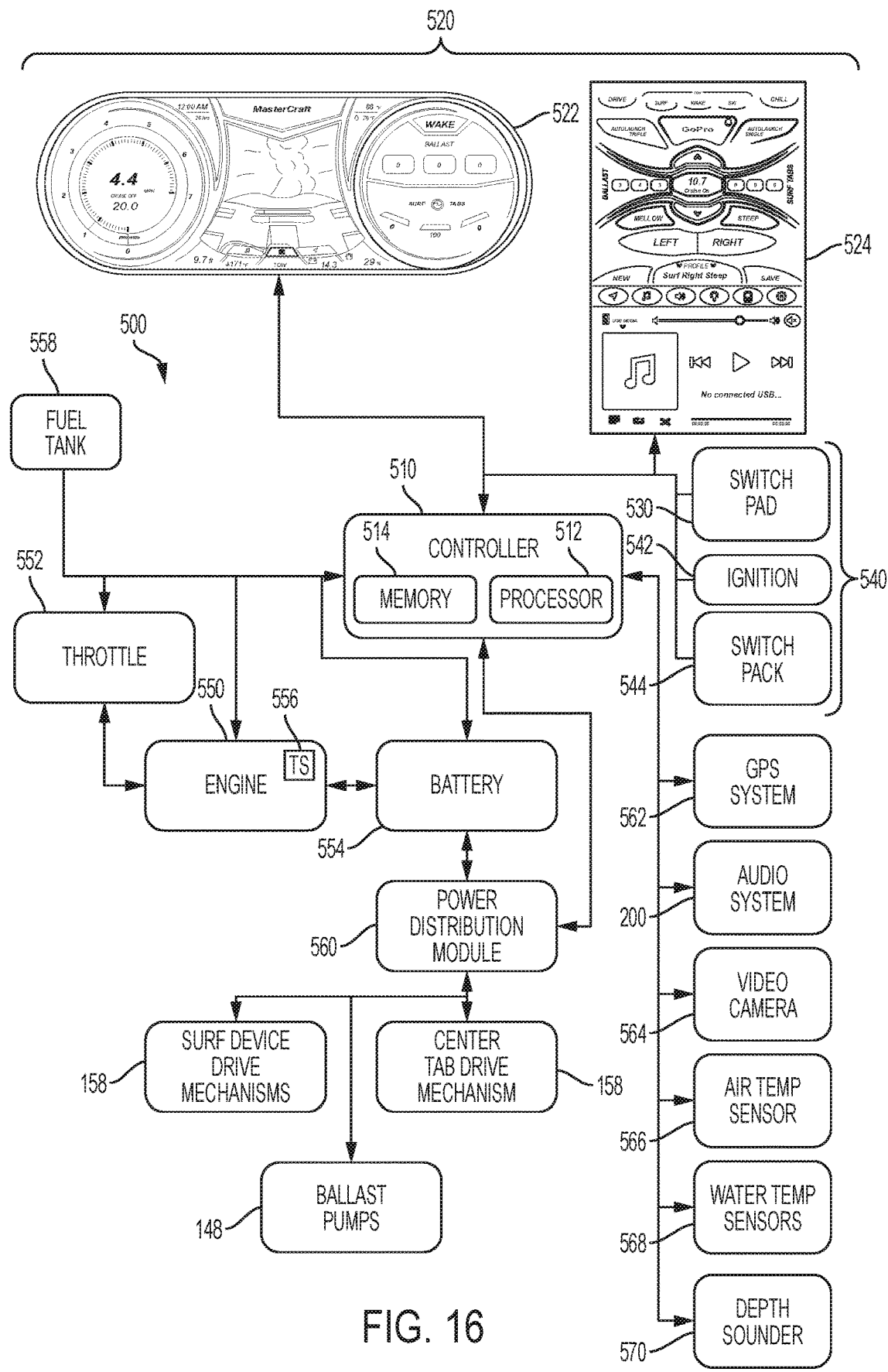
FIG. 16 is a schematic diagram of the control system for the boat shown in FIG. 1.

The audio system 200 described herein includes features that are integrated with the control system 500 of the boat. Additional details of the audio system 200 will be described after describing the control system 500 of the boat. FIG. 16 is a schematic diagram of the control system 500 for the boat 100 shown in FIG. 1. Various features of the control system 500 may also be seen in FIG. 3.

The control system 500 includes a controller 510. In this embodiment, the controller 510 is a microprocessor-based controller that includes a processor 512 for performing various functions, discussed further below, and a memory 514 for storing various data. The controller 510 may also be referred to as a CPU. In one embodiment, the various methods discussed below may be implemented by way of a series of instructions stored in the memory 514 and executed by the processor 512.

The controller 510 is communicatively coupled to at least one display screen 520. In this embodiment, the controller 510 is communicatively coupled to two display screens, a center display 522 and a side display 524. As can be seen in FIG. 3, the center display 522 is located at the top of the dash 320 above and forward of the steering wheel 312. The center display 522 is positioned and oriented so that the operator can be aware the information displayed on the center display 522 without substantially deviating his or her attention from the boat's heading. In this embodiment, for example, the operator is able to view the information displayed on the center display 522 without turning his or her head. With this positioning in mind and as will be discussed further below, the control system 500 is designed to display information on the center display 522 that is pertinent to the operator of the boat 100 while he or she is operating the boat 100 and not overburden him or her with information that is not relevant to the type of operation for which he or she is currently using the boat 100.

In this embodiment, the center display 522 is a 12-inch display having a generally rectangular shape in a landscape orientation and rounded inboard and outboard edges. The shape of the rounded inboard and outboard edges corresponds to the shape of the digital gauges discussed below. Although the center display 522 may be a touchscreen, the center display 522 in this particular embodiment is not because of the positioning of the center display 522 and the type of information displayed on it. The positioning of the center display 522 makes it difficult or awkward for a user to reach with his or her hand, so to the extent user-selectable options are displayed on the center display 522, they may be selected by using a switch pad 530 or another suitable input device 540.

Many of the input devices 540 (operator controls) on the boat 100 are conveniently located on the control console 300 to the side of the steering wheel 312. In this embodiment, the input devices 540 are located on the outboard side of the steering wheel 312 and can be conveniently operated by the operator's right hand. One of the main input devices 540 is the side display 524. In this embodiment, the side display 524 is a 10 inch, rectangular, touchscreen display that has a portrait orientation.

The side display 524, in concert with the center display 522, enables the use of dynamic controls. Users view the boat through different activity lenses. Put another way, users view the boat based on the type of activity they want to do. Instead of providing user-selectable options for every major feature of the boat on the side display 524 (and/or center display 522), the user-selectable controls displayed on the side display 524 and the corresponding information presented on the center display 522 are dynamic and change depending upon how the boat is currently being used. This dynamic control system thus provides a user-friendly interface for operating the boat 100.

In this embodiment, the dynamic control system is implemented by modes. Each different mode corresponds to a different activity, and each mode includes a plurality of controls corresponding to the activity of the mode. The plurality of controls of each mode is a subset of the major controls of the boat. There are three different modes (a drive mode, a tow mode, and a chill mode) in this embodiment, and when a mode is activated, the controller 510 displays on the side display 524 the plurality of controls in that mode. Similarly, each mode also includes a plurality of parameters of the boat (also referred to herein as operational parameters) corresponding to the activity of the mode. These operational parameters are also a subset of the major operational parameters of the boat. The information displayed on the center display 522 changes based on the active mode, and the controller 510 displays on the center display 522 the plurality of parameters of the boat corresponding to the activity of the mode. The plurality of controls and plurality of operational parameters for each of the three modes in this embodiment will be described in further detail below.

Other input devices 540 (controls) include the switch pad 530, an ignition button 542, and other static buttons and switches that are part of a switch pack 544. The buttons and switches of the switch pack 544 may be used to control various aspects of the boat 100. For example, the switch pack 544 may include a rocker switch to increase and decrease the volume of the audio system 200, as well as a mute button. Other buttons or switches of the switch pack 544 may be used to fill or empty the ballast 140 and to raise or lower the surf devices 152, 154 and center tab 156.

Located near the control console 300 on the starboard side wall 128 is a keyed switch 314. A key 316 unique to the boat can be inserted in the switch 314 and then rotated to turn on (or off) the electrical system of the boat. With the key 316 in the on position, an operator can press the ignition button 542 to turn on (or off) the engine 550. Also located near the control console 300 on the starboard side wall 128 is a control lever 318 to operate a throttle 552 of the engine 550 and engage the engine 550 with the drive shaft. The control lever 318 has a neutral position, and the operator may move the control lever 318 forward from the neutral position to engage a running gear with the drive shaft, accelerate the engine 550 using the throttle 552, and rotate the propeller to drive the boat 100 forward. To move the boat 100 in reverse, the operator may move the control lever 318 back from the neutral position to engage a reverse gear with the drive shaft, accelerate the engine 550 using the throttle 552, and rotate the propeller.

When the key 316 is rotated to turn on the electrical system of the boat, the controller 510 boots up in a default mode. In this embodiment, the default mode is the drive mode. The controller 510 displays, at the top of the side display 524, a plurality of user-selectable options to change between modes (see FIGS. 17C, 19C, 19D, 19E, and 20C). The plurality of user-selectable options are icons displayed on the side display 524 that may be selected by a user pressing the icon. The terms icon, virtual button, and button will be used interchangeably herein to describe these and other user-selectable options displayed by the controller 510 on the side display 524. One of the buttons 702 activates the drive mode, and another button 704 activates the chill mode. There are three different modes in the tow mode, and each of these three modes can be considered a sub-mode. One of these three sub-modes can be activated by selecting one of three buttons 706a, 706b, 706c. In this embodiment, a user can change between the various modes, with the control lever 318 in the neutral position, by selecting one of the buttons 702, 704, 706a, 706b, 706c corresponding to the desired mode. The controller 510 may also be configured to automatically switch between modes. For example, the controller 510 may automatically switch from the chill mode to the drive mode when the speed of the boat exceeds a predetermined speed. As discussed below, the controller 510 is communicatively coupled to a GPS system 562 and may be configured to receive the speed of the boat from the GPS system 562. With the chill mode active, the controller 510 compares the speed of the boat to a predetermined threshold (e.g., two miles per hour). When the speed of the boat exceeds the predetermined threshold, the controller 510 then activates the drive mode.

Various different visual indicators may be used with the displays 522, 524 to distinguish between modes. For example, each different mode may have a different color scheme. In this embodiment, for example, all of the modes have a common background (black and grays), but the accent color changes with the mode. In the drive mode, the accent color is white. In the tow mode, the accent colors are red and orange. And, in the chill mode, the accent color is blue.

Figure 17A:
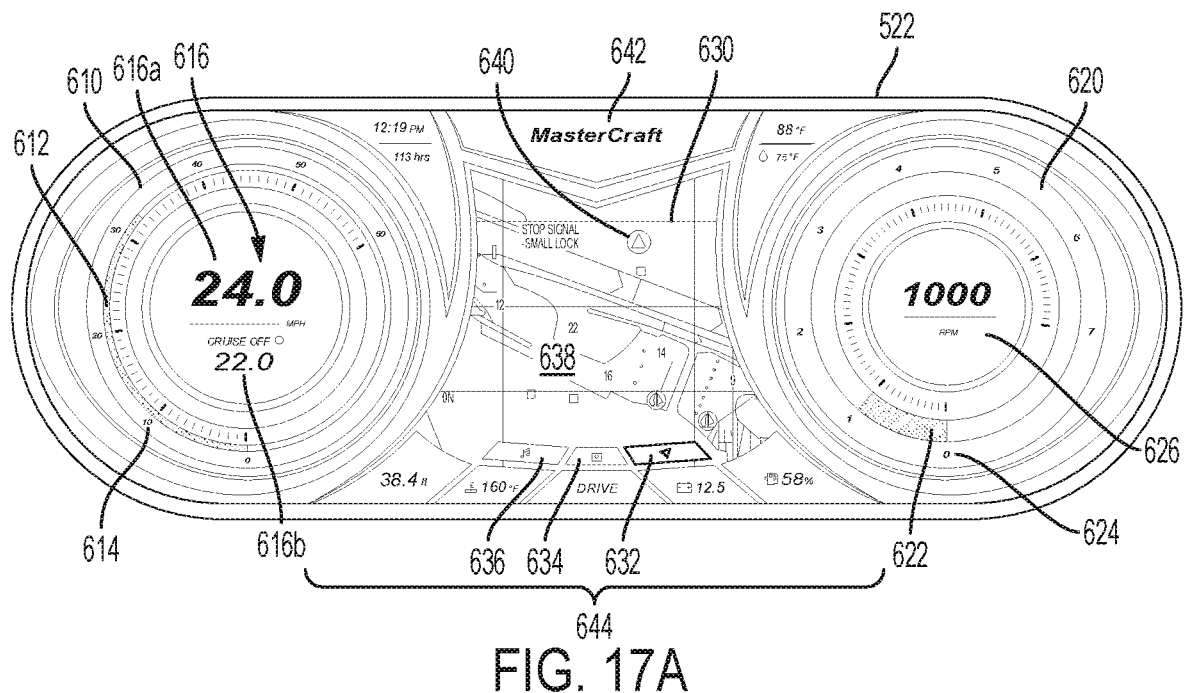
FIGS. 17A and 17B are screenshots of the center display of the control console shown in FIG. 3 in the drive mode.
Figure 17B:
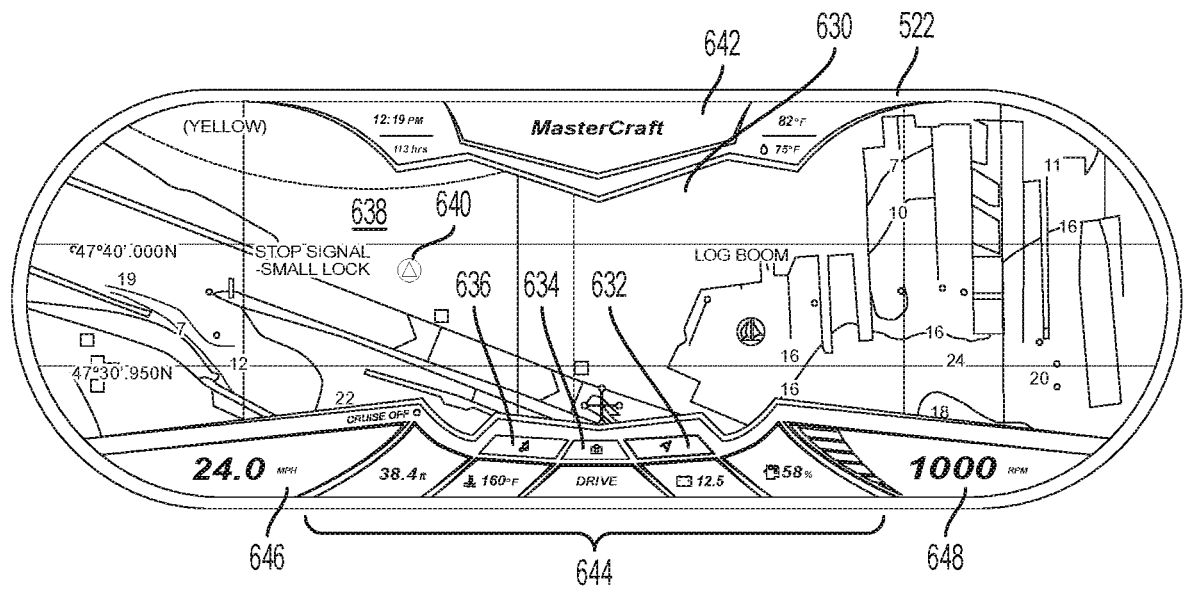
Figure 17C:
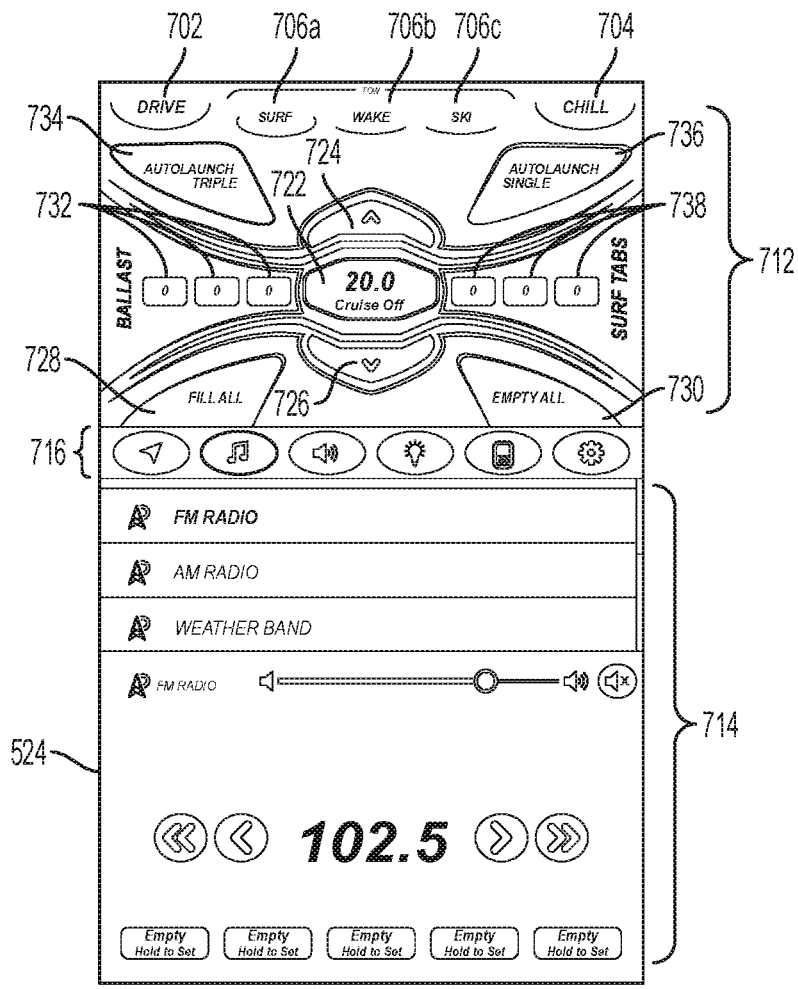
FIG. 17C is a screen shot of the side display of the control console shown in FIG. 3 in the drive mode.

Starting first with the drive mode, each of the modes in this embodiment will now be described. The drive mode corresponds to the activity of driving from one location to another (point-to-point transportation). For example, this mode corresponds to traveling from the dock to a location where the boat will be used for water sports and/or returning to the dock from that location after doing so. The drive mode may be suitably used, however, when the boat is transiting between any number of suitable locations including, for example, the places where the boat will be used for the activities discussed below relative to the chill mode or just general cruising. The information displayed on the center display 522 and the controls on the side display 524 thus correspond to point-to-point transportation. FIGS. 17A and 17B show two configurations of the center display 522 in the drive mode, and FIG. 17C shows the configuration of the side display 524 in the drive mode.

Operational parameters of the boat that are pertinent to point-to-point transportation include, for example, the speed of the boat 100; the speed of the engine 550; cruise control, including set speed; water depth; the temperature of the engine 550; total accumulated operating hours of the engine 550; the voltage of the battery 554; and fuel level. In this embodiment, the controller 510 displays each of these parameters on the center display 522 when in the drive mode. Other parameters that are measured or tracked by the boat 100 and controller 510 may also be considered operational parameters of the boat 100 and can include, for example, the water temperature, the air temperature, and time of day. These other parameters may also be displayed by the controller 510 on the center display 522 when operating in drive mode. In addition to measured values, other operational parameters that can be displayed on the center display 522 by the controller 510 when operating in drive mode include digital navigation charts (or maps), camera views, and an identifier of the audio sound being played through the audio system 200.

In more detail, the controller 510 displays these parameters of the boat 100 on the center display 522 as shown in FIGS. 17A and 17B. In the configuration shown in FIG. 17A, the center display 522 contains two digital gauges, one on the left (inboard) 610 and one on the right (outboard) 620, that resemble analog gauges. The left gauge 610 is a digital speedometer gauge. The controller 510 is communicatively coupled to a GPS system 562, or other suitable speed sensing device, and receives the speed of the boat 100 from the GPS system. The controller 510 then displays, using an indicator such as a bar 612 that rotates about a central axis of the left gauge 610 next to a scale 614, the current speed of the boat 100. The scale 614 includes marks and numerals indicating the speed of the boat 100 in miles per hour, for example. Instead of the bar 612, any suitable indicator may be used, such as a rotatable image that resembles a needle on an analog gauge. The current speed of the boat 100 may also be digitally displayed on the upper half 616a of the center 616 of the left gauge 610. On the lower half 616b of the center 616 of the left gauge 610, an indicator may be displayed to indicate if cruise control is on and the speed at which the cruise control is set.

The right gauge 620 is a digital tachometer gauge. The controller 510 is communicatively coupled to the engine 550 and receives the speed of the engine 550 from the engine 550. The controller 510 then displays, using an indicator such as a bar 622 that rotates about a central axis of the right gauge 620 next to a scale 624, the current speed of the engine 550. The scale 624 includes marks and numerals indicating the speed of the engine 550 in revolutions per minute (RPM) of the crankshaft, for example. Instead of the bar 622, any suitable indicator may be used, such as a rotatable image that resembles a needle on an analog gauge. The current speed of the engine 550 may also be digitally displayed in the center 626 of the right gauge 620.

Figure 18:
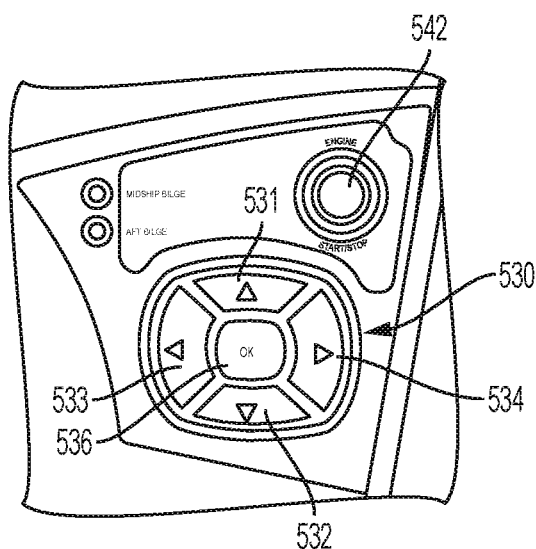
FIG. 18 is a detail view of the switch pad of the control console shown in FIG. 3.
Figure 19A:
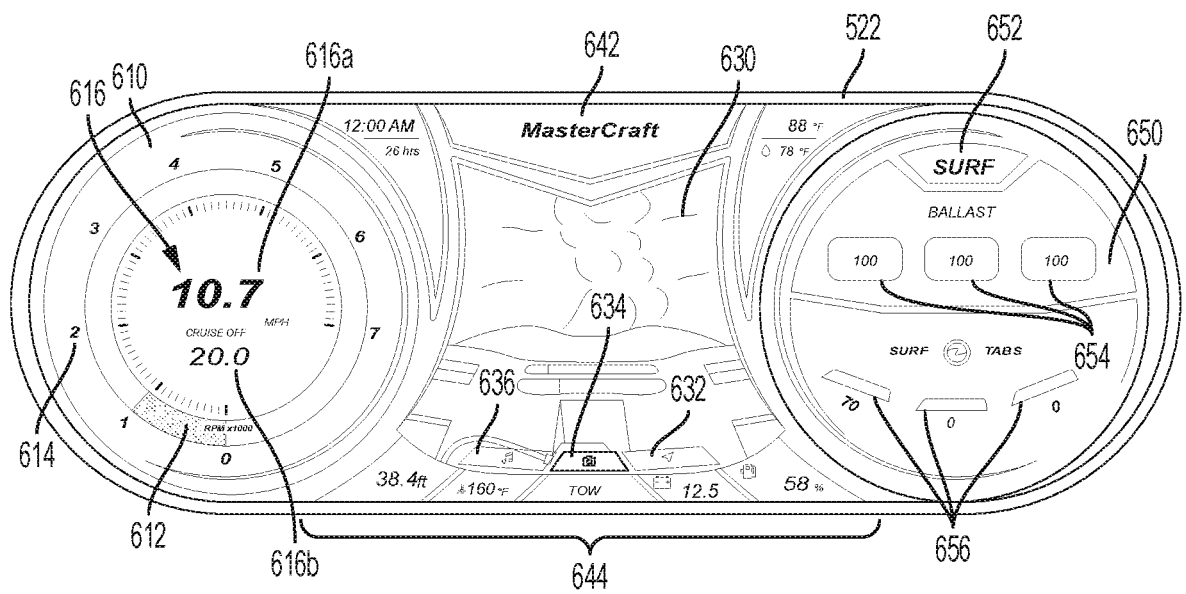
FIGS. 19A and 19B are screenshots of the center display of the control console shown in FIG. 3 in the tow mode.
Figure 19B:
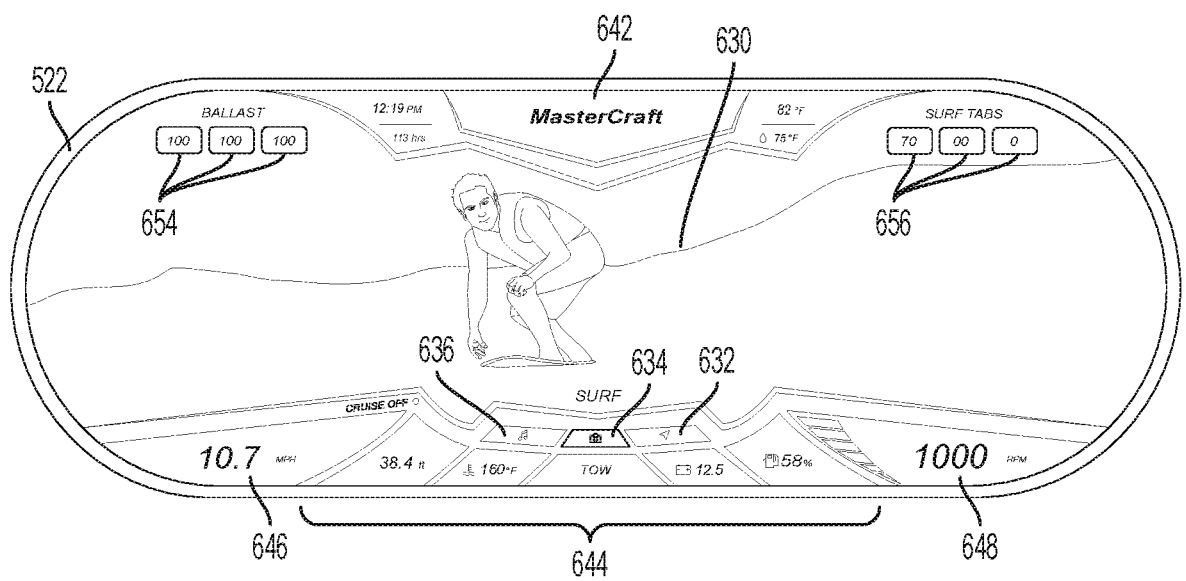
Figure 20A:
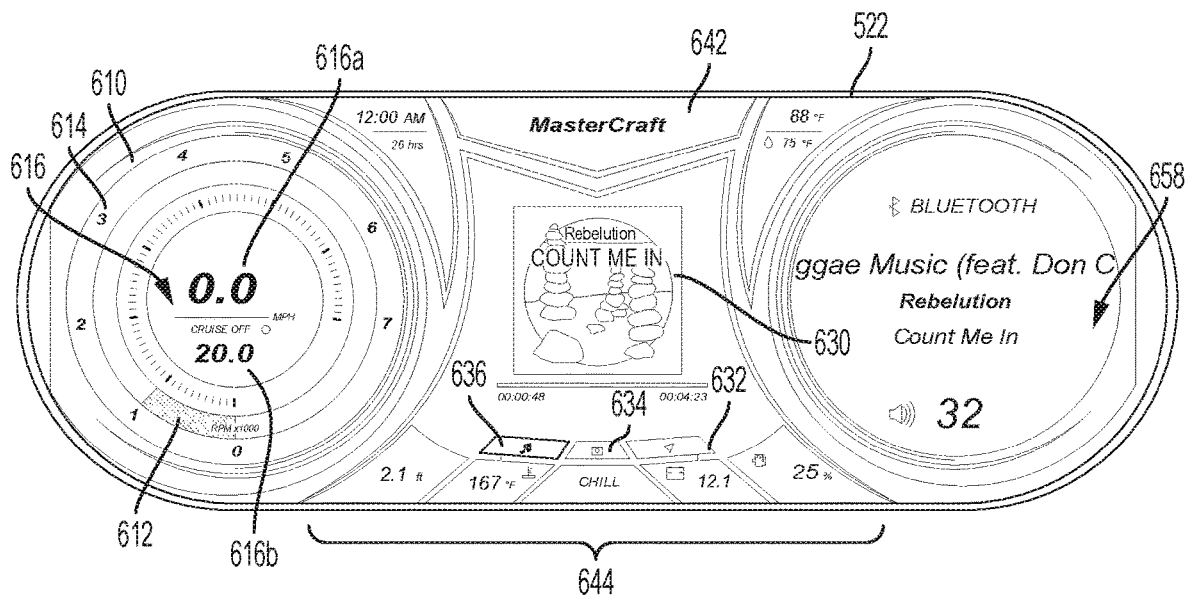
FIGS. 20A and 20B are screenshots of the center display of the control console shown in FIG. 3 in the chill mode.
Figure 20B:
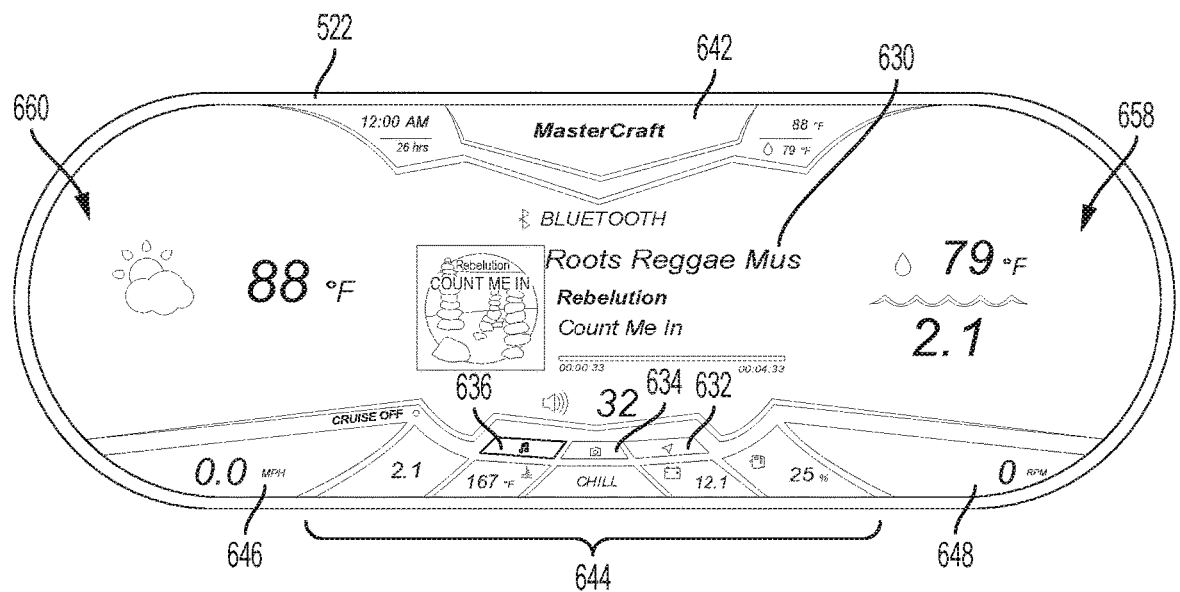
Figure 20C:
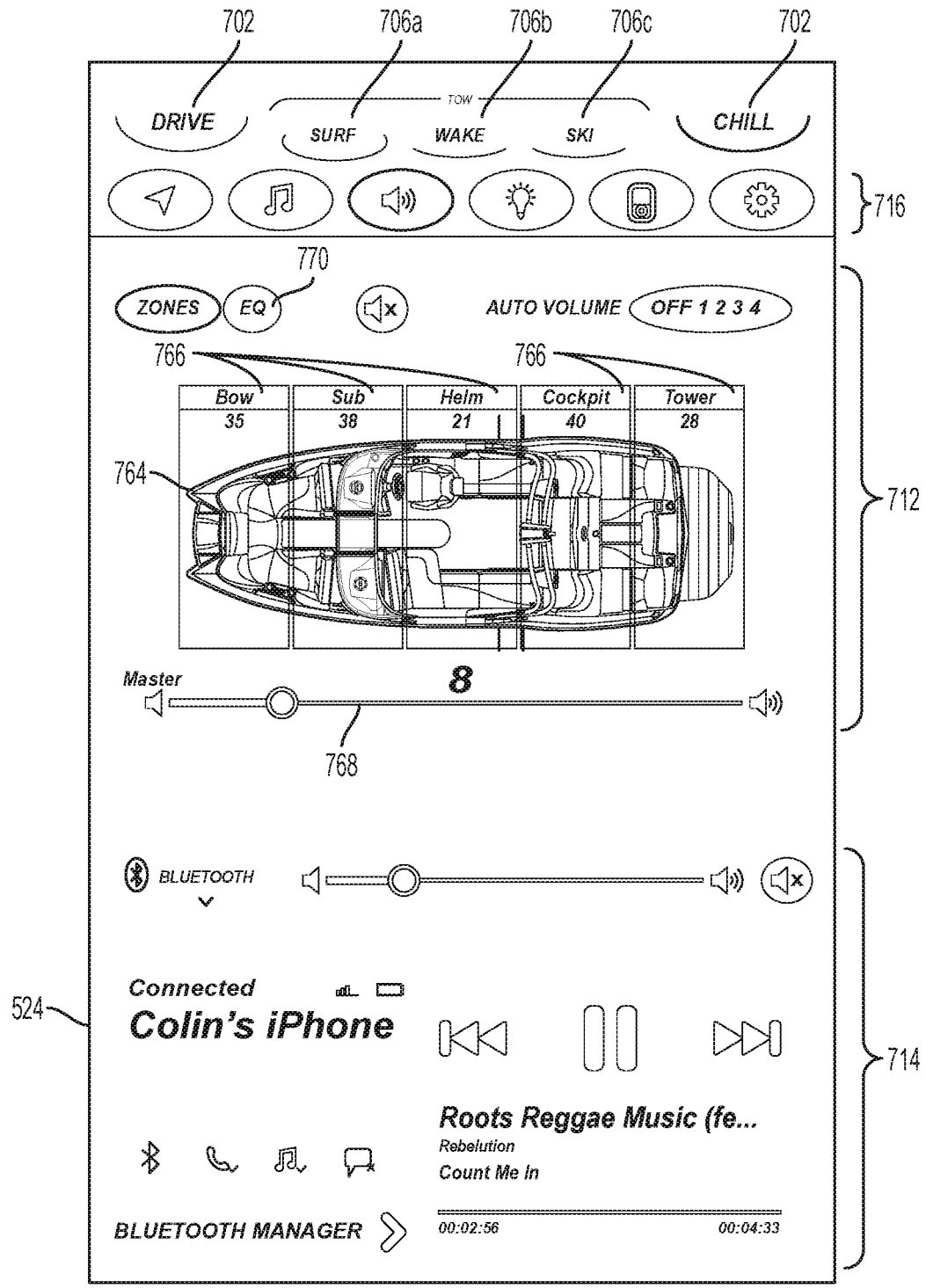
FIG. 20C is a screen shot of the side display of the control console shown in FIG. 3 in the chill mode.

Between the left and right gauges 610, 620 is a center screen 630. The center screen 630 can be used to display information pertinent to traveling from one point to another. For example, an operator may select one of three options to display on the center screen 630. These three options may include a digital navigation map, a camera (such as a video camera 564 positioned near the towline attachment structure 168 on the tower 160), and information from the audio system 200. An operator may use the left and right buttons 533, 554 of the switch pad 530 (see FIG. 18) to navigate between three user-selectable virtual buttons, a map button 632, a camera button 634, and an audio button 636. The OK button 536 may be used to acknowledge notification information, as discussed below. The center display 522 with the map button 632 selected is shown in FIGS. 17A and 17B. The center display 522 with the camera button 634 selected is shown in FIGS. 19A and 19B. The center display 522 with the audio button 634 selected is shown in FIGS. 20A and 20B.

When the user selects the map option, the controller 510 displays navigation information including a navigation map 638 and position 640 of the boat 100 on the center screen 630. In particular, the controller 510 retrieves a navigation map 638 stored in the memory 514 and displays a portion of the map 638 on the center screen 630. The controller 510 also receives the location of the boat 100 from the GPS system 562 and uses the location of the boat 100 to determine which portion of the map 638 is displayed. The controller 510 displays the portion of the map 638 corresponding to the boat's current location and overlays a visual indicator 640 of the boat's current position on the map 638. Although these features have been described as being stored in the memory 514 of the controller 510 using the processor 512 of the controller 510, these functions may also be implemented by the GPS system 562. In that case, when the map option is selected, the controller 510 retrieves from the GPS system 562 the navigation information and displays the navigation information on the center screen 630.

When the user selects the camera option, the controller 510 displays a portion of the video feed of the camera 564 on the center screen 630, as shown in FIGS. 19A and 19B. When the user selects the audio system option, the controller 510 displays information from the audio system 200 (audio system information) on the center screen 630. This audio system information may include, for example, information relating to the audio source and the type of audio being played, such as the album cover artwork from the album corresponding to the song being played together with the duration of the song and the current location in the song, as shown in FIGS. 20A and 20B.

The center screen 530 may also be used to display notification information. For example, the controller 510 may be coupled to various sensors, for example, a temperature sensor 556 located in the engine 550. When these sensors send (and the controller 510 receives) a signal, the controller 510 may display on the center screen 630 of the center display 522 an indicator related to the parameter measured by the sensor. An indicator may be a warning or a danger symbol indicating that a component on the boat requires service or may be at risk of failure. The engine temperature sensor 556, which is communicatively coupled to the controller 510, measures the engine temperature and sends the temperature to the controller 510, for example. When the engine temperature exceeds a predetermined threshold, the controller 510 displays a high engine temperature warning on the center screen 630. Other notification information may relate to notifications from the audio system 200. When a phone is connected to the audio system 200, for example, the audio system may transmit to the controller 510 (and the controller 510 receives), notifications received or generated on the phone, such as when a call is received by the phone, the phone number and name of the originator of the call.

In this embodiment, the other operational parameters related to point-to-point transportation are displayed above and below the center screen 630. In a top section 642 above the center screen 630, the controller 510 displays a logo related to the boat manufacturer, MasterCraft® in this embodiment, the time of day and engine hours between the logo and the left gauge 610, and the air temperature and water temperature between the logo and the right gauge 620. In a bottom section 644 below the center screen 630, the controller 510 displays the water depth, the engine temperature, the mode, the voltage of the battery 554, and fuel level.

The controller 510 is communicatively coupled to various sensors that may be used to measure each of the parameters displayed in the sections in the top and bottom sections 642, 644 (see FIG. 16). The controller 510 may also include features to track and calculate these parameters displayed in the top and bottom sections 642, 644. In this embodiment, the controller 510 may include a clock which is used to calculate the time of day. As discussed above, the controller 510 is communicatively coupled to the engine 550 and may receive from the engine 550 the total operating hours of the engine 550. The controller 510 may also be communicatively coupled to an air temperature sensor 566 and a water temperature sensor 568. The air temperature sensor 566 and the water temperature sensor 568 measure the air and water temperatures, respectively, and then transmit (and the controller 510 receives) these temperatures. The controller 510 may be communicatively coupled to a depth sounder 570 located on the keel of the boat to receive the depth of the water under the keel as measured by the depth sounder 570. The controller 510 is also communicatively coupled to a voltmeter electrically connected to the battery 554, and the controller 510 receives the voltage of the battery 554 as measured by the voltmeter. The controller 510 may also be communicatively coupled to a float, or another suitable sensor, located in the fuel tank 558 of the boat 100 and the controller receives the level of the fuel as measured by the float.

The center display 522 also includes an expanded view as shown in FIG. 17B. In the expanded view, the digital gauges are removed allowing for a wider view of the information that is displayed on the center screen 630. As shown in FIG. 17B, for example, more of the map 638 may be shown. When in the expanded view, the information that was displayed on the left and right gauges 610, 620 may still be displayed on the center display 522. In this embodiment, for example, the speed of the boat 100 is digitally displayed in a section 646 to the left of the bottom section 644 and the engine speed is digitally displayed in a section 648 to the right of the bottom section 644. An operator may switch from the standard view (FIGS. 17A, 19A, and 20A) to the expanded view (FIGS. 17B, 19B, and 20B), and vice versa, by pressing the down button 532 and the up button 531 of the switch pad 530, respectively.

FIG. 17C shows the side display 524 in the drive mode. In each of the modes, the side display 524 is divided, having an upper section 712 and a lower section 714. In this embodiment, the lower section 714 comprises a larger area of the side display 524 than the upper section 712 in the drive mode, but other divisions may be suitable, including roughly in half. Many of the plurality of controls that correspond to point-to-point transportation are displayed on the upper section 712 of the side display 524. In this embodiment, for example, a cruise control button 722 is prominently located in the center of the upper section 712. When the cruise control button 722 is selected, the controller 510 receives a signal from the side display 524 to activate cruise control, if off, or deactivate cruise control, if already on. The cruise control button 722 may display the set speed of the cruise control and give an indication if cruise control is on or off such as by turning a different color when active (e.g., green). When a user selects the cruise control button 722 to turn cruise control on, the controller 510 activates cruise control at the set speed stored in the memory 514 of the controller 510. Any suitable cruise control may be used including, for example, GPS-based Zero Off cruise control by Enovation Controls of Tulsa, Okla., in which the controller 510 operates the throttle 552 of the engine 550 to maintain the boat 100 at the set speed based on the speed of the boat received by the GPS system 562. A user can adjust the set speed of the cruise control by using an up arrow button 724 or a down arrow button 726 located above and below, respectively, the cruise control button 722. The up arrow button 724 is used to the increase the set speed for the cruise control stored in the memory 514 of the controller 510, and the down arrow button 726 is used to decrease the set speed.

The side display 524, in the drive mode, also includes user-selectable options relating to ballast. In particular, the controls corresponding to point-to-point transportation include a fill all button 728 and an empty all button 730. The ballast 140 may take some time to fill (between 5 and 8 minutes, for example), and may also take a similar time to empty. A user may thus desire to fill the ballast 140 while the boat is driven to a location where water sports will be conducted. By pressing the fill all button, the controller 510 receives a command to fill the ballast tanks 142, 144, 146 of the boat and sends a signal to the power distribution module (PDM) 560 to provide power to the ballast pumps 148 for a predetermined amount of time to fill the ballast tanks 142, 144, 146. In response, the power distribution module 560 receives electrical power from the battery 554 and then transmits power to the ballast pumps 148 to fill the ballast tanks 142, 144, 146. Similarly, a user may desire to empty the ballast 140 while the boat 100 is driven after the water sports have been completed. By pressing the empty all button, the controller 510 receives a command to empty the ballast tanks 142, 144, 146 and sends a signal to the power distribution module 560 to provide power to the ballast pumps 148. In response, the power distribution module 560 powers the ballast pumps 148 to empty the ballast tanks 142, 144, 146.

The controller 510 also displays a ballast tank fill indicator 732 on the side display 524 to indicate water level in the ballast tanks 142, 144, 146. In this embodiment, the controller 510 calculates the fill percentage for the ballast tanks 142, 144, 146 based on the time that the ballast pumps 148 have operated, but other suitable methods may be used including a sensor in each ballast tank 142, 144, 146, for example. In this particular embodiment, user-selectable options for individual ballast tanks 142, 144, 146 or other fill levels are not displayed on the side display 524 as part of the controls corresponding to point-to-point transportation. Instead, an operator would need to select the ballast tank fill indicator 732 to bring up a pop-up menu to change the ballast level to a level other than completely full for all tanks or completely empty for all ballast tanks 142, 144, 146. A user may also manually fill or empty the ballast tanks 142, 144, 146 using a switch in the switch pack 544 as discussed above.

The side display 524, in the drive mode, also includes user-selectable options to activate methods that assist in getting the boat 100 on plane. In this embodiment, the side display 524 includes two user-selectable options: an AutoLaunch Triple button 734 and an AutoLaunch Single button 732. When a user selects the AutoLaunch Triple button 734, a command is received by the controller 510 to activate a method for getting on plane that uses the port and starboard surf devices 152, 154 and the center tab 156. Any suitable method may be used including the improved method of getting a boat on plane as shown and described in U.S. Patent Application Publication No. 2016/0214681, which is incorporated by reference herein in its entirety. In response to the command, the controller 510 then activates and implements the method for getting on plane as the boat 100 is accelerated either by the user or the controller 510.

When a user selects the AutoLaunch Single button 736, a command is received by the controller 510 to activate a method for getting on plane that uses only the center tab 156. Initially, the controller 510 moves the center tab 156 to its deployed position (to the extent it is not already in its deployed position) by sending a signal to the power distribution module 560, which in turn provides power to the drive mechanism 158 of the center tab 156. As the boat 100 is accelerated, either by the operator or the controller 510, the controller 510 monitors the speed of the boat 100 using the GPS system or other suitable speed sensing device and automatically retracts the center tab 156 when the boat 100 reaches a set speed preferably between 15 mph and 20 mph. The controller 510 retracts the center tab 156 by sending a signal to the power distribution module 560, which in turn provides power to the drive mechanism 158 of the center tab 156.

The controller 510 also displays a tab position indicator 738 on the side display 524 to indicate the position of the surf devices 152, 154 and center tab 156 in terms of percentage relative to a fully-deployed position. In this embodiment, the controller 510 calculates the percentage of deployment, but other suitable methods may be used including a sensor in each drive mechanism 158, for example. In this particular embodiment, user-selectable options for individual surf devices 152, 154 and center tab 156 deployment percentages are not displayed on the side display 524 as part of the controls corresponding to point-to-point transportation. Instead, an operator would need to select tab position indicator 738 to bring up a pop-up menu to change the individual position of the surf devices 152, 154 and center tab 156. A user may also manually operate the surf devices 152, 154 and center tab 156 using a switch in the switch pack 544 as discussed above.

As shown in FIG. 17C, the lower section 714 of the side display 524 includes user-selectable options to operate the audio system 200 and, in particular, shows a head unit for the radio. In this embodiment, the controls to operate the audio system 200 are the default display and may be considered controls that correspond to point-to-point transportation. The controls to operate the audio system 200 may include, for example, a tuner to adjust the frequency of the radio, including a plurality of preset stations, as shown in FIG. 17C. The controls to operate the audio system 200 may also include, for example, volume controls, controls to skip audio tracks, pause playing the audio, repeat the audio, or return to a previous audio track (as shown in FIGS. 19C, 19D, 19E, and 20C).

The lower section 714 of the side display 524 also display other user-selectable options. A plurality of accessory buttons 716 are located between the upper portion 712 and the lower portion 714. By selecting one of these accessory buttons 716, a user can change the controls on the lower section 714 of the side display 524. One of the accessory buttons 716 may display the navigation map 638. Another one of the accessory buttons 716 may be a stereo equalizer for the audio system 200, discussed further below. Still another accessory button 716 may include controls for the lighting, including navigational lighting, on the boat 100. Controls for ballast pumps, seat heaters, and other accessories may also be accessed through the accessory buttons 716. One of the accessory buttons 716 may allow access to a settings menu for the control system 500 or other settings for the boat 100. In addition, one of the accessory buttons 716 may be used to return to the default controls for the drive mode. Other than the default controls (controls for the audio system 200, in this embodiment), the controls displayed by selecting one of the accessory buttons 716 are not displayed on the side display 524 as controls corresponding to point-to-point transportation.

Figure 19C:
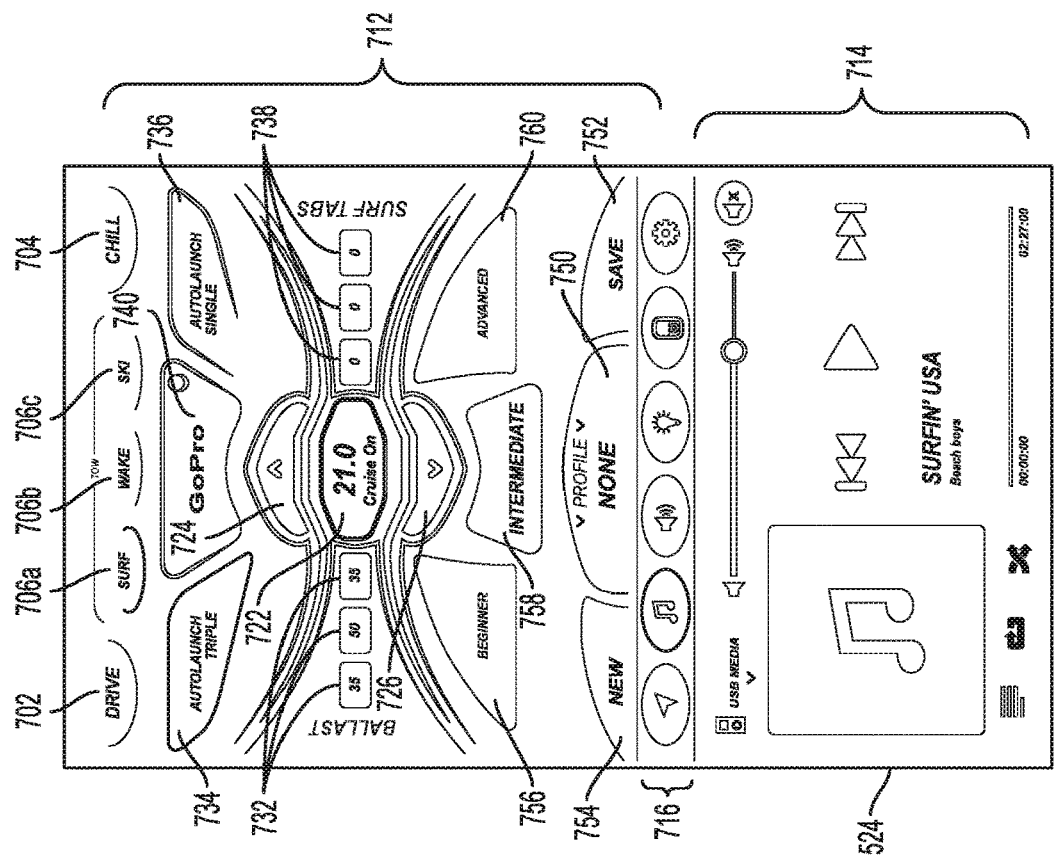
FIG. 19C is a screen shot of the side display of the control console shown in FIG. 3 in the surf mode.
Figure 19D:
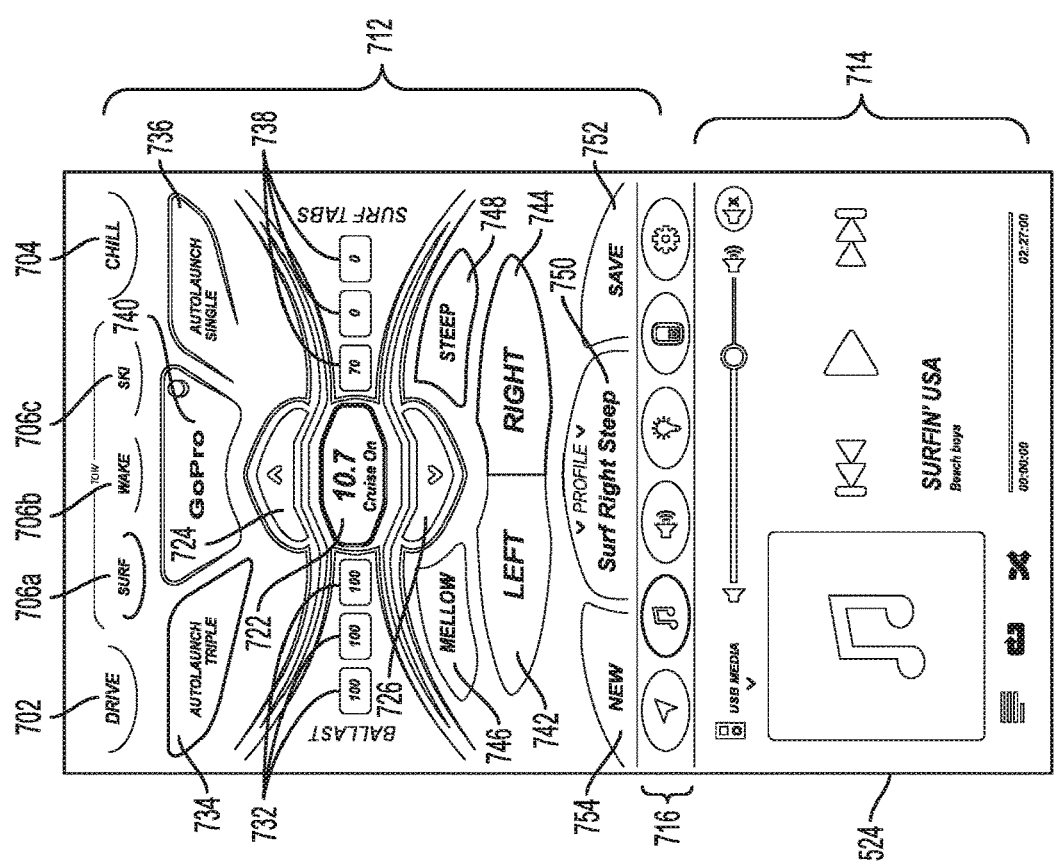
FIG. 19D is a screen shot of the side display of the control console shown in FIG. 3 in the wake mode.
Figure 19E:
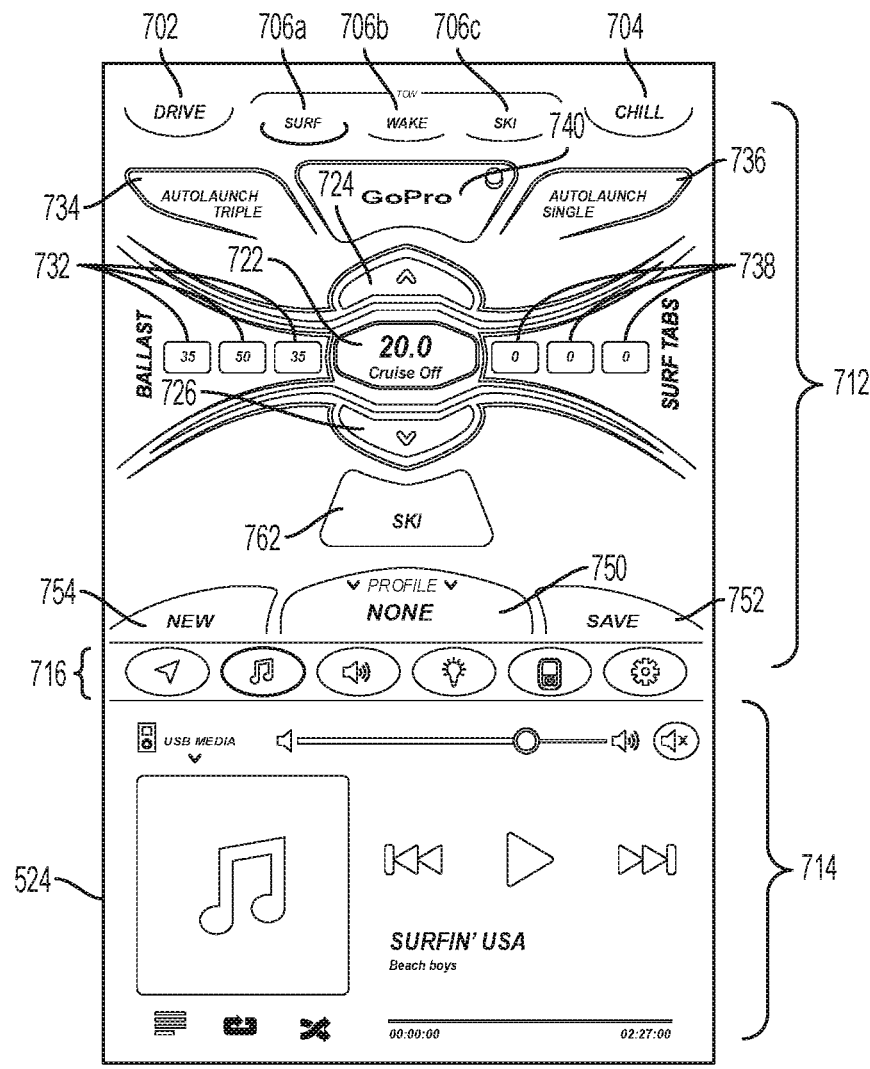
FIG. 19E is a screen shot of the side display of the control console shown in FIG. 3 in the ski mode.

The tow mode corresponds to using the boat for water sports. In this embodiment, and as discussed above, there are three sub-modes, each corresponding to a different water sport. One of the water sports is wake surfing (surf 706a), another one of the water sports is wakeboarding (wake 706b), and the third water sport is water skiing (ski 706c). The information displayed on the center display 522 and the controls on the side display 524 thus correspond to the particular water sport. In this embodiment, the information displayed on the center display 522 is the same for all three sub-modes/water sports, with the exception of an indicator 652 of the specific tow mode. However, the controls on the upper section 712 of the side display 524 differ between the sub-modes/water sports. FIGS. 19A and 19B show two configurations of the center display 522 in the tow mode. FIG. 19C shows the configuration of the side display 524 in the surf mode. FIG. 19D shows the configuration of the side display 524 in the wake mode. FIG. 19E shows the configuration of the side display 524 in the ski mode.

The operational parameters of the boat that are pertinent to water sports include, for example, those pertinent to point-to-point transportation discussed above relative to the drive mode as well as the level of water in the ballast tanks 142, 144, 146 and the position of the surf devices 152, 154 and center tab 156.

The parameters and layout of the center display 522 in the tow mode are similar to the parameters and layout of the center display 522 in the drive mode. As shown in FIG. 19A, however, the right gauge 620 is replaced with indicators 654 of the level of water in the ballast tanks 142, 144, 146 and indicators 656 of the position of the surf devices 152, 154 and center tab 156. The controller 510 may display the indicators 654 of the level of water in the ballast tanks 142, 144, 146 on the center display 522 in the same way it displays the corresponding indicators 732 on the side display 524. Similarly, the controller 510 may display the indicators 656 of the position of the surf devices 152, 154 and center tab 156 on the center display 522 in the same way it displays the corresponding indicators 732 on the side display 524. These indicators 654, 656 may include, for example, graphical indications or numerical values representing a percentage of fill or deployment.

In this embodiment, the speed of the engine 550 and the speed of the boat 100 are displayed in a combined speedometer/tachometer as the left digital gauge 610. Although any suitable layout may be used, the left gauge 610 displays the speed of the engine 550 using the bar 612 and scale 614 and the center 616 of the left gauge 610 remains unchanged to show the speed of the boat 100.

The expanded view of the center display 522 in the tow mode is also similar to the expanded view of the center display 522 in the drive mode. As shown in FIG. 19B, for example, more of the video feed from the video camera 564 may be shown. In this embodiment, the indicators 654 of the level of water in the ballast tanks 142, 144, 146 are located to the left of the top section 642 above the center screen 630, and the indicators 656 of the position of the surf devices 152, 154 and center tab 156 are located to the right of the top section 642 above the center screen 630.

FIG. 19C shows the side display 524 in the tow mode for wake surfing. FIG. 19D shows the side display 524 in the tow mode for wakeboarding. FIG. 19E shows the side display 524 in the tow mode for water skiing. In this embodiment, controls that are common to all three tow modes include the AutoLaunch buttons 574, 576 and cruise control features 722, 724, 726, discussed above with regard to the drive mode. Also common to all three tow modes is a video recording button 740. As discussed above, the control system 500 is communicatively coupled to at least one video camera 564. Although any suitable connection may be used, in this embodiment, the control system includes a WiFi® chip allowing a WiFi® enabled video camera 564, such as a GoPro® camera, for example, to be wirelessly connected to the control system 500. A user may select the video recording button 740 by sending a command from the side display 524 via the controller 510 to the video camera to turn on or off the video recording functions of the camera 564. Where more than one video camera 564 is connected to the control system 500, the video recording button 740 may enable synchronous recording of all cameras 564. Although described in reference to a video camera 564, other suitable cameras including still digital photo cameras may be used.

The side display 524 in each of the tow modes also includes at least one user-selectable option that configures the boat 100 for the wake sport being performed. The configuration of the boat 100 corresponding to each of the user-selectable options that will be described below may be stored in the memory 514. When a command is received from the side display 524 indicating that a particular configuration has been selected, the controller 510 retrieves the settings for the configuration and operates various components to configure the boat 100 according to the settings. For the water sports discussed herein, the settings stored in the memory will typically be a set speed for the cruise control, the water level in the ballast tanks 142, 144, 146, and the positions of the surf devices 152, 154 and center tab 156. The controller 510 will operate these components as discussed above when a particular configuration is selected. The controls that correspond to water sports, and in particular the water sports of wake surfing, wakeboarding, and water skiing, may include controls for cruise control, user-selectable options for a method that assists in getting the boat 100 on plane, at least one user-selectable option that configures the boat 100 for the wake sport being performed, and controls for the audio system 200.

In this embodiment, the wake surf mode includes at least two user-selectable configurations for wake surfing: surf left and surf right. As shown in FIG. 19C, the side display 524 includes a surf left button 742 and a surf right button 743. For each of the wake surf configurations discussed herein, each ballast tank 142, 144, 146 is preferably set at 100% full.

However, other suitable fill conditions may be appropriate, including, for example, filling the ballast tank 142, 144 on the surf side (e.g., port side ballast tank 142 for the surf left button 742 and the starboard side ballast tank 144 for the surf right button 744) more than the ballast tank 142, 144 on the non-surf side. The set speed for the cruise control is a speed suitable for surfing, preferably between 9 mph to 12 mph. The controller 510 will also deploy one of the surf devices 152, 154 used for creating a surf wake for a surfer. When the surf devices discussed in U.S. Pat. No. 8,833,286 are used, for example, the starboard surf device 154 is deployed in response to the controller 510 receiving a command from a user selecting the surf left button 742, and the port surf device 152 is deployed in response to the controller 510 receiving a command from a user selecting the surf right button 744. When the surf devices 152, 154 discussed in the fourth through the seventh embodiments of U.S. Patent Application Publication No. 2015/0175242 are used, the port surf device 152 is deployed in response to the controller 510 receiving a command from a user selecting the surf left button 742, and the starboard surf device 154 is deployed in response to the controller 510 receiving a command from a user selecting the surf right button 744. In addition to the position of the surf devices 152, 154, in some surf wake configurations, the center tab 156 may also be moved.

In addition to surf left and surf right, the wake surf mode may include other boat configurations for wake surfing. In this embodiment, for example, the side display 524 includes a mellow button 746 and a steep button 748, each associated with settings for a different style of wave on the surf side of the boat 100. The mellow button 746 is associated with settings that produce a longer and flatter wave than the settings associated with the steep button 748. Stored in the memory 514 are two configuration settings for each of surf left and surf right. With one of the surf left button 742 or the surf right button 744 selected, the user also selects one of the mellow button 746 or the steep button 748, and the controller 510 adjusts the configuration of the boat 100 for that wave style for the surf side of the boat, resulting in four user-selectable options for wake surfing in this embodiment. When the surf devices discussed in U.S. Pat. No. 8,833,286 are used, for example, the deployed position for the surf device 152, 154 may be shallower (less of a deployed percentage) when the mellow button 746 is selected than the deployed position for the surf device 152, 154 when the steep button 748 is selected. In addition to, or instead of, differing deployed positions of the surf device 152, 154 for mellow and steep boat configurations, the set speed may be different. For example, the speed of the boat 100 may be slower by from 0.2 to 0.6 mph when the steep button 748 is selected compared to when the mellow button 746 is selected.

In addition to these preprogrammed settings, the memory 514 may also store user-defined wake surf configurations, also referred to as profiles. The side display 524 includes a profile button 750 that brings up a drop-down menu of the profiles, including the user-defined profiles, stored in the memory 514. The side display 524 also includes a save button 752 and a new button 754 that allows a user to save the current configuration of the boat 100 as a profile or to create a new profile, respectively.

In this embodiment, the wakeboarding mode includes three user-selectable configurations for wakeboarding that adjust the configuration of the boat relative to the skill level of the wakeboard. As shown in FIG. 19D, the side display 524 includes a beginner button 756, an intermediate button 758, and an advanced button 760. Although the wake surf devices 152, 154 and center tab 156 may be used in each of the wakeboarding configurations, each of these devices are fully retracted for each of the three wakeboarding configurations of this embodiment. The differences between the wakeboarding configurations are the set speed for cruise control and the ballast. For all three wakeboard configurations, the set speed of the boat is preferably from 18 mph to 25. The set speed associated with the beginner button 756 is preferably the slowest, preferably from 18 mph to 20 mph. The set speed associated with the advanced button 760 is preferably the fastest, preferably at from 23 mph to 25 mph. The set speed associated with the intermediate button 758 is preferably between the set speeds associated with the beginner button 756 and the advanced button 760, preferably at from 20 mph to 22 mph. The ballast conditions may be different between each wakeboarding configuration as well. For example, the ballast conditions for the port ballast tank 142, the center ballast tank 146, and starboard ballast tank 144 associated with the beginner button 756 are each preferably from 0% to 15%. Likewise, the ballast conditions associated with the intermediate button 758 are each preferably from 30% to 60%, and the ballast conditions associated with the advanced button 760 are each preferably from 70% to 100%.

In the wakeboarding mode, one of the AutoLaunch options, such as the AutoLaunch Single button 732, may be activated by default in order to assist the boat 100 in quickly reaching the wakeboarding set speeds. As with the wake surf mode, the side display 524 also includes the profile button 750 and the ability to save and create new profiles (save button 752 and new button 754).

In this embodiment and as shown in FIG. 19E, the ski mode includes a single configuration (ski button 762) that adjusts the configuration of the boat 100 for water skiing. Unlike the configurations of the boat for wake surfing and wakeboarding, water skiers generally prefer to minimize the wake. In this embodiment, the settings associated with the ski button 762 include no ballast and both surf devices 152, 154 fully retracted. In this embodiment, the center tab 156 is also fully retracted, but the settings associated with the ski button 762 may deploy the center tab 156 to provide lift to the stern of the boat and help minimize the wake. The settings associated with the ski button 762 also include a set speed that is preferably from 28 mph to 36 mph. As with the wake surf mode, the side display 524 also includes the profile button 750 and the ability to save and create new profiles (save button 752 and new button 754).

As with the drive mode, many of the plurality of controls that correspond to water sports are displayed on the upper section 712 of the side display 524 in each of the tow modes. In this embodiment, the upper section 712 comprises a larger area of the side display 524 than the lower section 714 in each tow mode, and by default, the lower section 714 shows the controls for the audio system 200.

The chill mode corresponds to boating activities when the boat 100 is not moving through the water. For present purposes, the boat 100 is considered as not moving through the water when it is not being propelled through the water by the engine 550, and the phrase not moving through the water is not intended to exclude conditions were the boat 100 is moving through the water from other conditions, such as where the boat is floating and being moved by wind, currents, or the like. Boating activities when the boat 100 is not moving through the water include, for example, swimming, sunbathing, grilling, or otherwise relaxing ("chilling"). The boat 100 is typically used for these activities when the boat 100 is anchored, moored to the dock, positioned on a sandbar or beach, or otherwise floating in the body of water without being propelled by the engine 550.

The parameters and layout of the center display 522 in the chill mode are similar to the parameters and layout of the center display 522 in the drive mode. As shown in FIG. 20A, however, additional audio information is displayed on a right display area 658 in place of the right gauge 620 and the left gauge 610 is the combined speedometer/tachometer (discussed above in reference to FIG. 19A). The additional audio information displayed on the right display area may include, for example, the audio source, the volume of the audio system, and identifiers of the audio being played. When the audio being played is a song, for example, the identifiers of the audio may include, the name of the song, the name of the artist, and the album.

Because of the audio focus of the chill mode, users will often display information from the audio system 200 on the center screen 630 by selecting the audio button 634. The expanded view of the center display 522 with the audio button 634 selected is shown in FIG. 20B, and includes information that corresponds to boating activities when the boat 100 is not moving through the water. For the expanded view, the water temperature and depth are shown in the right display area 658, and the air temperature is shown in a left area 660, which replaces the left gauge 610. The controller 510 may also display current weather conditions, received through a weather band of the audio system 200, in the left area 660.

As discussed above, the chill mode is audio focused, and the controller 510 displays on the lower section 714 of the side display 524 controls for the audio system 200. Thus, in this embodiment, the controls corresponding to boating activities when the boat 100 is not moving through the water include controls for the audio system 200. In the upper section 712 of the side display 524, and in place of the cruise control and other boat configuration settings discussed above with respect to the drive mode and tow mode, the controller 510 displays the controls that may be accessed by selecting one of the accessory buttons 716. By default, the controller 510 displays the stereo equalizer for the audio system 200. In this embodiment, the stereo equalizer shows a schematic 764 of the boat 100 that has been divided into a plurality of user-selectable sections 766 that are overlayed on the schematic 764. The plurality of user-selectable sections 766 divides the boat 100 into zones and may be referred to herein as zone buttons 766. In this embodiment, there are five zones, one for the bow speakers 214 in the bow seating area 132, one for the subwoofer(s) 220, one for the dash speakers 218 (helm), one for the cockpit speakers 216, and one for the tower speakers 212. A user may select a zone button 766 and adjust the volume of that zone as a percentage of the master volume. The master volume is shown digitally and may be adjusted by a user-selectable slide bar 768. In addition, the equalizer may also include an option 770 to adjust the bass frequencies, midrange frequencies, and treble frequencies relative to each other and the master volume.

Throughout the full range of uses for the boat 100, users often desire to play audio through the audio system 200 in the boat 100. However, the full range of uses often has very different ambient noise conditions, which must be overcome to hear the audio played through the audio system 200. For example, the ambient noise is minimal when the boat is tied to the dock but may be high when used for wakeboarding. Merely adjusting the volume of the audio system 200, or even the volume of select speakers, may not adequately compensate for the different ambient noise conditions. For example, the ambient conditions may destructively interfere with select frequencies being emitted from the speakers of the audio system. Consequently, if the volume is increased (increasing the gain of all the full audio spectrum being output) to overcome this destructive interference, the other frequencies that are not subject to interference will be emphasized, compared to the original or intended audio.

A solution this problem is to adjust the gain of select frequencies or frequency ranges to account for the ambient sound and operational conditions of the boat. This select frequency adjustment may be made by digital signal processing, and the dynamic control system 500 enables a unique implementation of digital signal processing of select frequencies or frequency ranges as will be described below.

Figure 21:
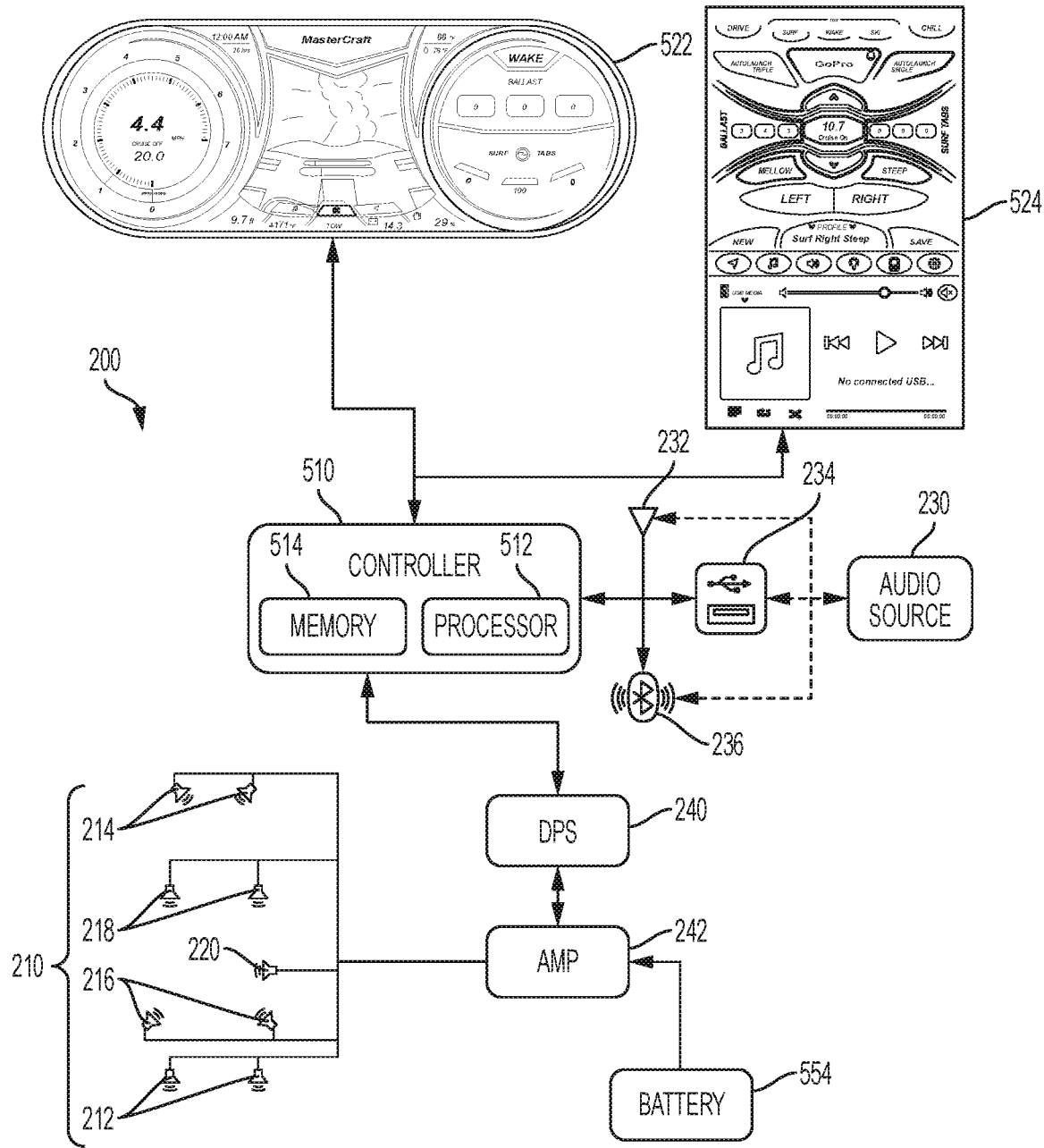
FIG. 21 is a schematic of the audio system of the boat shown in FIG. 1.

FIG. 21 is a schematic of the audio system 200 of the boat 100. The audio system receives 200 audio signals from an audio source 230. The audio source may be any suitable audio source including, for example, audio received by an AM/FM radio receiver; audio received by satellite radio receiver; digital media stored on a digital media player such as a mobile phone or iPod®; digital streaming service using a device, such as a mobile phone, that is communicatively coupled to a wireless network; and audio stored on a compact disc (CD) and played using a CD player. The audio source 230 may be integrated into the boat 100. For example, an AM/FM radio receiver 232 may be built into the boat and operated through the control system 500 of the boat 100. The audio system 200 may also be configured to allow an external audio source 230 to be coupled to the audio system 200 using, for example, a cable connecting the audio source 230 to an audio input interface 234 and/or a short distance wireless receiver/transmitter 236. The audio input interface 234 may include a 3.5 mm audio port, a universal serial bus (USB) port, a high-definition multimedia interface port, or an optical interface port, and the short distance wireless receiver/transmitter 236 may use the Bluetooth® protocol, for example.

As discussed above, the audio source 230 may be operated by the controller 510 through user-selectable options displayed by the controller 510 on the side display 524 and in this way, the controller 510 and side display 524 operates as a head unit. The controller 510 is communicatively coupled to a digital signal processing unit 240. The controller 510 receives the audio signal from the audio source 230 and transmits the audio signal, together with the operating mode (in this embodiment, drive, surf, wake, ski, or chill), the master volume level, and any volume adjustment relative to the master volume level (discussed above relative to zones), to the digital signal processing unit 240. The digital signal processing unit 240 includes a processor and a memory that is configured to digitally process the audio signal according to a prescribed algorithm. Any suitable digital signal processing unit and algorithm may be used including, for example, the Bongiovi Digital Power Station™ and corresponding algorithm by Bongiovi Acoustics of Port Saint Lucie, Fla.

The audio spectrum, the range of frequencies that humans can hear, generally extends from 20 Hz to 20 kHz. In this embodiment, the digital signal processing unit 240 remasters the audio signal to extend the range of the audio signal to the full range of audio frequencies, if the input audio signal has been clipped because of audio compression. For example, if the audio source is limited to bass frequencies only as low as 100 Hz, the digital signal processing unit 240 will restore the range of frequencies down to 20 Hz. The audio spectrum may be divided into a plurality of subranges. In this embodiment, the audio spectrum is divided into seven subranges, as shown in Table 1 below, although the frequencies may be divided into any number of suitable divisions.

TABLE 1

| Frequency Range | Frequency Values |
|---|---|
| Sub-bass | 20 Hz to 60 Hz |
| Bass | 60 Hz to 250 Hz |
| Low midrange | 250 Hz to 500 Hz |
| Midrange | 500 Hz to 2 kHz |
| Upper midrange | 2 kHz to 4 kHz |
| Presence | 4 kHz to 6 kHz |
| Brilliance | 6 kHz to 20 kHz |

Figure 22:
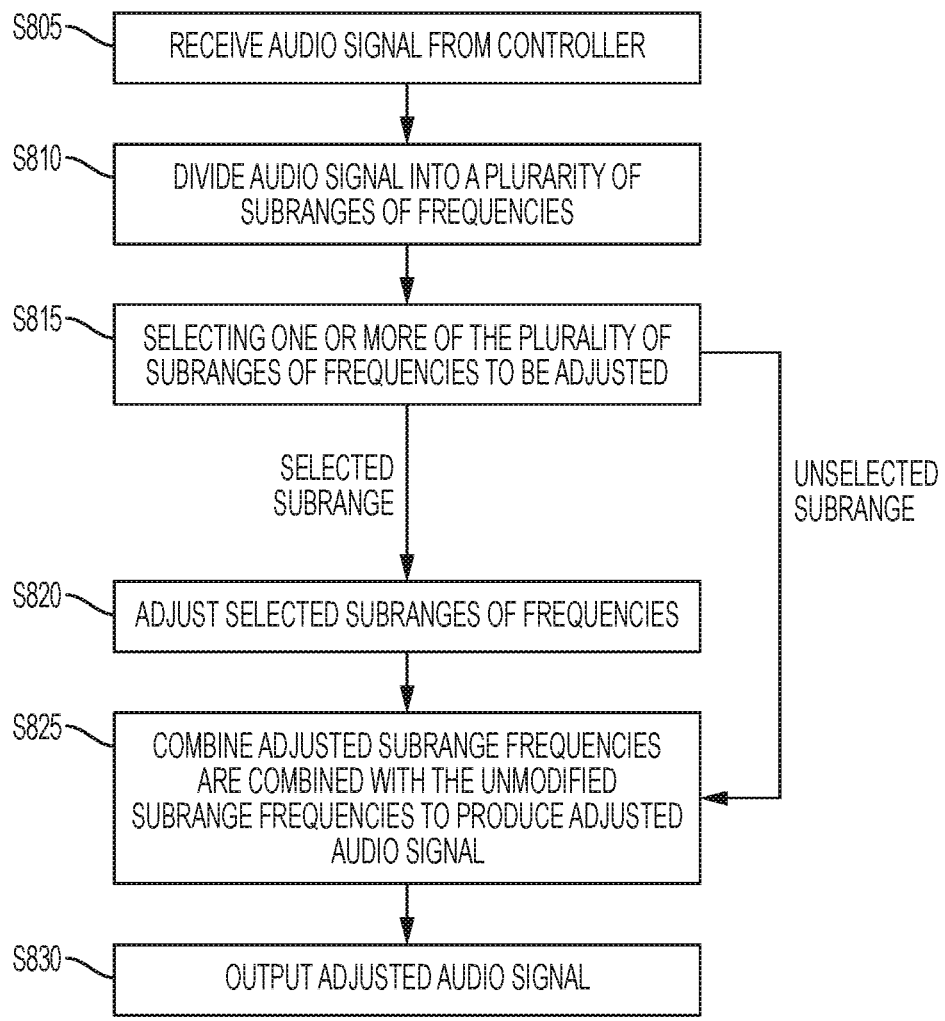
FIG. 22 is a flow chart showing how the audio system shown in FIG. 21 compensates for at least one environmental condition associated with an operating condition of the boat.

FIG. 22 is a flow chart showing how the digital signal processing unit 240 compensates for at least one environmental condition associated with an operating condition of the boat 100. In step S805, the received audio signal is received and then, in step S810, it is divided into the plurality of subranges of frequencies. One or more, but not all, of the subranges of frequencies are selected in step S815, and then each selected subrange is adjusted by modifying the gain of frequencies in the subrange to compensate for environmental conditions in step S820. Because each mode corresponds to a particular activity of the boat 100, each mode also corresponds to particular environmental conditions such as ambient noise and operational noise related to the activity of the mode. The subranges selected in step S815 are based on the mode, and the adjustments are made to compensate for the environmental conditions of that mode as discussed below. These subrange frequency adjustments may even be made on the basis of the output speaker location. As discussed above, the boat 100 may be divided into five zones, one for the bow speakers 214 in the bow seating area 132, one for the subwoofer(s) 220, one for the dash speakers 218 (helm), one for the cockpit speakers 216, and one for the tower speakers 212. The frequency adjustment may thus be tailored to compensate for the environmental conditions in a particular zone.

In the chill mode, the boat 100 is not moving and the engine is operating at a low engine speed, if at all. Overall there is very little ambient operation and operational noise for boating activities when the boat is not moving through the water. Consequently, none of the subranges are modified to compensate for environmental conditions in the chill mode. A common activity done with the boat in the chill mode is swimming. Often swimming is near the boat, and as a result, the tower speakers 212 are set to project sound at the desired volume relatively close to the boat 100, preferably from 10 ft. to 40 ft., and more preferably 25 ft. from the tower speakers 212.

In the drive mode, the boat 100 may be operating at planing speeds (e.g., higher than 20 mph) but with the boat 100 often lightly loaded, reducing the engine speed relative to that produced in wake mode, for example. The wakes produced are also relatively small and there is relatively little water noise from the wake. Thus, in the drive mode, the bow speakers 214 are set to compensate for high noise levels from wind. Engine noise typically plays a minimal role in the bow seating area 132. In this embodiment, for example, the frequency subranges adjusted to compensate for these environmental conditions include frequencies in the high frequency ranges (presence and brilliance) and in the mid frequency ranges (low midrange, midrange, and high midrange). The dash speakers 218 are set to compensate for moderate noise levels from the engine 550. Because of the windshield 104, it is often not necessary to compensate for wind at the dash speakers 218. The frequency subranges adjusted to compensate for these environmental conditions include frequencies in the mid-frequency ranges. The cockpit speakers 216 are set to compensate for high noise levels from both wind and the engine 550, and the frequency subranges adjusted to compensate for these environmental conditions include frequencies in the high and mid frequency ranges.

When skiing, the boat 100 is operated at the highest speeds of the tow modes (e.g., from 28 mph to 36 mph) with minimal wake. These conditions are similar to those of the drive mode, and in this embodiment, the audio signal for each of the bow, helm, and cockpit speakers 214, 216, 218 are adjusted in the same way as they are in the drive mode. The water skier is towed a distance behind the boat and the tower speakers 212 are thus set to provide to project sound at the desired volume to the skier, preferably from 40 ft. to 100 ft., and more preferably 85 ft. from the tower speakers 212.

In the surf mode, the boat 100 travels at the slowest speeds of the tow modes (e.g., 9 mph to 12 mph) and thus has the least amount of wind noise, other than in the chill mode. Even though the boat is operating at slower speeds, the engine 550 must overcome loads from the additional ballast added to the boat and drag from deployed surf devices 152, 154, generating a moderate amount of noise. In addition, the waves are large and generate water noise in the aft part of the boat 100. In this embodiment, the bow and dash speakers 214, 218 are set to compensate for moderate noise levels, but without any subrange frequency adjustments specific to environmental conditions (e.g., the frequency subranges are set at the normal equalizer curve). The cockpit speakers 216, however, are set to compensate for moderate noise levels from both the engine 550 and the water, and the frequency subranges adjusted to compensate for these environmental conditions include frequencies in the mid frequency ranges. Surfing is done near the boat 100, and as a result, the tower speakers 212 are set to project sound at the desired volume relatively close to the boat 100, preferably from 10 ft. to 40 ft., and more preferably 25 ft. from the tower speakers 212

Wakeboarding also generates noise from the water with typical speeds higher than wake surfing speeds (e.g., from 18 mph to 25 mph). In the wake mode, the bow speakers 214 are set to compensate for moderate noise levels from wind, and the frequency subranges adjusted to compensate for these environmental conditions include frequencies in the mid frequency ranges. The cockpit speakers 216 are set to compensate for moderate noise levels from the engine 550 and the water, and the frequency subranges adjusted to compensate for these environmental conditions include frequencies in the mid frequency ranges. In this embodiment, the dash speakers 218 are set to compensate for moderate noise levels, but without any subrange frequency adjustments specific to environmental conditions (e.g., the speakers 218 operate using the normal equalizer curve).

The subranges of frequencies that are selected and adjusted in steps S815 and S820 are referred to herein as "adjusted subrange frequencies" and the subranges not selected are referred to herein as "unmodified subrange frequencies." For each zone, the adjusted subrange frequencies are combined with the unmodified subrange frequencies in step S825 to produce an adjusted audio signal. The audio adjustments to the audio signal received from the controller 510 are not limited to those discussed above and the digital signal processing unit 240 may apply other signal processing and filters to the audio signal to generate the adjusted audio signal.

As shown in FIG. 21, the digital signal processing unit 240 is communicatively coupled to an amplifier 242. Any suitable amplifier may be used. In step S830, the digital signal processing unit 240 outputs the adjusted audio signal for each speaker pair to the amplifier 242, and the amplifier 242, drawing power from the battery 554, amplifies the adjusted audio signal to produce an amplified adjusted audio signal for each speaker pair. The amplifier 242 is communicatively coupled to each of the speaker pairs and transmits the amplified adjusted audio signal to each speaker 212, 214, 216, 218, 220, which in turn produces the audio sound.

The control system 500 and audio systems 200, including the dash speaker 218 configuration, include various different aspects. The different aspects of these systems 200, 500, may be used in various combinations. For example, the dash speaker 218 configuration described herein may be implemented with a boat having a control system different from the control system described herein. Likewise, the control system 500 may be implemented on boats having different speaker configurations and audio systems 200 or even no audio system at all.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A boat comprising:
   a hull including a bow, a transom, and port and starboard sides;
   a deck including a floor;
   a windshield mounted at a first non-zero angle with respect to the floor;
   a dash positioned proximate the windshield, the dash including a top surface and an opening; and
   a speaker mounted under the top surface of the dash at a second non-zero angle with respect to the floor, the speaker being positioned to direct sound emanating from the speaker through the opening in the dash.

2. The boat according to claim 1, further comprising a centerline, the dash being positioned on the starboard side of the centerline of the boat.

3. The boat according to claim 2, further comprising:
   a second dash positioned proximate the windshield on the port side of the centerline of the boat, the second dash including a top surface and an opening; and
   a second speaker mounted under the top surface of the second dash at a third non-zero angle with respect to the floor, the second speaker being positioned to direct sound emanating from the speaker through the opening in the second dash.

4. The boat according to claim 1, further comprising a grille covering the opening in the dash.

5. A boat comprising:
   a hull including a bow, a transom, and port and starboard sides;
   a deck including a floor;
   a windshield mounted at a first non-zero angle with respect to the floor; and
   a speaker positioned proximate the windshield at a second non-zero angle with respect to the floor, the speaker being positioned at the second non-zero angle to form an acute angle with the windshield.

6. The boat according to claim 5, further comprising a dash, the dash being positioned proximate the windshield, the speaker being mounted to the dash.

7. The boat according to claim 5, further comprising a dash, the dash being positioned proximate the windshield, the dash including a top surface and an opening, the speaker being mounted under the dash and positioned to direct sound emanating from the speaker through the opening in the dash.

8. The boat according to claim 7, further comprising a grille covering the opening in the dash.

9. The boat according to claim 5, wherein the speaker is a first speaker and the boat further comprises a second speaker positioned proximate the windshield at a third non-zero angle with respect to the floor, the second speaker being positioned at the third non-zero angle to form an acute angle with the windshield.

10. The boat according to claim 9, further comprising a centerline, the first speaker being positioned on the starboard side of the centerline of the boat and the second speaker being positioned on the port side of the centerline of the boat.

11. A boat comprising:
    a hull including a bow, a transom, and port and starboard sides;
    a deck including a floor;
    a windshield mounted at a first non-zero angle with respect to the floor;
    a dash positioned proximate the windshield, the dash including a top surface; and
    a plurality of speakers mounted under the top surface of the dash, each speaker mounted at a non-zero angle with respect to the floor and positioned to direct sound emanating from the respective speaker through an opening in the dash.

12. The boat according to claim 11, wherein the plurality of speakers includes a first speaker and a second speaker.

13. The boat according to claim 12, wherein the first speaker is mounted at a second non-zero angle with respect to the floor and the second speaker is mounted at a third non-zero angle with respect to the floor.

14. The boat according to claim 13, wherein the second non-zero angle and the third non-zero angle are the same.

15. The boat according to claim 12, further comprising:
    a first enclosure mounted under the dash and including a lower portion and an upper portion, the upper portion of the first enclosure having an opening, wherein the first speaker is mounted in the lower portion of the first enclosure and positioned to direct sound emanating from the first speaker through the opening in the first enclosure; and
    a second enclosure mounted under the dash and including a lower portion and an upper portion, the upper portion of the second enclosure having an opening, wherein the second speaker is mounted in the lower portion of the second enclosure and positioned to direct sound emanating from the second speaker through the opening in the second enclosure.

16. The boat according to claim 15, wherein each of the first enclosure and second enclosure further includes a bottom wall located in the lower portion of the respective enclosure, and the first speaker and the second speaker are mounted to the bottom wall of the corresponding enclosure.

17. The boat according to claim 11, further comprising:
an enclosure mounted under the dash and including a lower portion and an upper portion, the upper portion of the enclosure having an opening,
wherein each of the plurality of speakers is mounted in the lower portion of the enclosure and positioned to direct sound emanating from the speaker through the opening in the enclosure.

18. The boat according to claim 17, wherein the enclosure further includes a bottom wall located in the lower portion of the enclosure, and each of the plurality of speakers is mounted to the bottom wall of the enclosure.

* * * * *